(12) United States Patent
Ishihara et al.

(10) Patent No.: US 8,064,312 B2
(45) Date of Patent: Nov. 22, 2011

(54) DISK ACCOMMODATING DEVICE, DISK APPARATUS AND ELECTRONIC APPARATUS

(75) Inventors: Hajime Ishihara, Ibaraki (JP); Kazusato Tagawa, Chiba (JP)

(73) Assignee: Sony Computer Entertainment Inc., Tokyo (JP)

( * ) Notice: Subject to any disclaimer, the term of this patent is extended or adjusted under 35 U.S.C. 154(b) by 753 days.

(21) Appl. No.: 12/116,417

(22) Filed: May 7, 2008

(65) Prior Publication Data
US 2009/0122681 A1  May 14, 2009

(30) Foreign Application Priority Data
May 11, 2007  (JP) ................. 2007-126932

(51) Int. Cl.
  *G11B 17/04*  (2006.01)
(52) U.S. Cl. .................................... 369/75.11
(58) Field of Classification Search ............. 369/75.11
  See application file for complete search history.

(56) References Cited

U.S. PATENT DOCUMENTS

| | | | | |
|---|---|---|---|---|
| 5,642,344 | A * | 6/1997 | Yamada et al. | 720/640 |
| 6,178,149 | B1 * | 1/2001 | Nakamura et al. | 720/638 |
| 6,418,090 | B1 * | 7/2002 | Takashima | 369/13.21 |
| 6,813,147 | B2 * | 11/2004 | Jeong | 361/679.06 |
| 2002/0001279 | A1 * | 1/2002 | Fujisawa | 369/75.2 |
| 2005/0229195 | A1 * | 10/2005 | Liu | 720/655 |
| 2006/0026613 | A1 * | 2/2006 | Mao et al. | 720/655 |
| 2006/0277558 | A1 * | 12/2006 | Wang et al. | 720/657 |

FOREIGN PATENT DOCUMENTS

| | | |
|---|---|---|
| JP | 55-57102 | 10/1978 |
| JP | 60-106290 | 7/1985 |
| JP | 62-69855 | 5/1987 |
| JP | 1-154555 | 10/1989 |
| JP | 3-76241 | 7/1991 |
| JP | 6-243565 | 9/1994 |
| JP | 8-198363 | 8/1996 |

(Continued)

OTHER PUBLICATIONS

Japanese Notice of Reason(s) of Rejection, dated Jul. 12, 2011, from corresponding Japanese Application No. JP2007-126932.

(Continued)

*Primary Examiner* — Mark Blouin
(74) *Attorney, Agent, or Firm* — Katten Muchin Rosenman LLP

(57) ABSTRACT

A disk accommodating device for accommodating a disk includes a housing on which an opening portion for allowing the disk to be accommodated into a disk accommodating section therethrough is formed, and a lid member for closing up the opening portion. The housing has a support portion for supporting a one-end side of the lid member for pivotal motion such that the other end side of the lid member may move toward and away from the housing. The disk accommodating section has an upright piece attached for pivotal motion on the side opposite to the side thereof on which the support portion is provided such that the upright piece engages at one end thereof with the disk accommodating section and at the other end thereof with the lid member so as to be erected uprightly from the disk accommodating section in response to pivotal motion of the lid member. The upright piece has a raising up portion provided thereon for raising up, when the lid member is pivoted in a direction in which the lid member is spaced away from the housing, the disk accommodated in the disk accommodating section from the disk accommodating section.

20 Claims, 15 Drawing Sheets

FOREIGN PATENT DOCUMENTS

| | | |
|---|---|---|
| JP | 9-7362 | 1/1997 |
| JP | 11-25561 | 1/1999 |
| JP | 2000-145270 | 5/2000 |
| JP | 2002-184072 | 6/2002 |
| JP | 2005-116345 | 4/2005 |
| JP | 2005-267828 | 9/2005 |
| JP | 2005-346888 | 12/2005 |

OTHER PUBLICATIONS

Japanese Notice of Reason(s) of Rejection, dated Jul. 12, 2011, from corresponding Japanese Application No. JP2008-108222.

* cited by examiner

DISK ACCOMMODATING DEVICE, DISK APPARATUS AND ELECTRONIC APPARATUS

The priority application Number JP2007-126932 upon which this patent application is based is hereby incorporated by reference.

BACKGROUND OF THE INVENTION

1. Field of the Invention

This invention relates to a disk accommodating device for accommodating a disk therein, a disk apparatus which includes the disk accommodating device, and a portable electronic apparatus which includes the disk apparatus.

2. Description of the Related Art

In the past, a disk apparatus is known which carries out recording of data on a disk and reading out of data from a disk on which data are recoded magnetically or optically. In recent years, the size of such a disk apparatus as just described has a tendency to decrease, and also portable disk apparatus are known. As one of such portable disk apparatus as just described, a disk apparatus (electronic apparatus) is known which includes a lid member (lid section) for opening and closing an exterior housing member (outer housing) and a holder provided on the lid member for accommodating a disk (for example, refer to Japanese Patent Laid-Open No. 2005-267828).

In the disk apparatus disclosed in the document mentioned, if the lid member is opened with respect to the exterior housing, then a holder provided on the inner side of the lid member is exposed to enable insertion of a disk into the holder. Therefore, if the lid member is closed with respect to the exterior housing in a state wherein the disk is inserted in the holder, then the disk is accommodated into the inside of the exterior housing together with the holder.

However, the disk apparatus disclosed in the document mentioned above has a problem in that, when a disk is accommodated into the exterior housing, since it is necessary to insert the disk into the holder provided on the lid member, the disk cannot be accommodated into the exterior housing readily. Further, the disk apparatus has a problem in that, even where the lid member is pivoted so as to move away from the exterior housing to open a disk accommodating opening by a great amount, the disk cannot be taken out readily because the disk is accommodated in the holder.

SUMMARY OF THE INVENTION

Therefore, it is demanded to provide a disk accommodating device, a disk apparatus and an electronic apparatus by which accommodation and taking out of a disk can be carried readily.

According to one embodiment of the present invention, there is provided a disk accommodating device for accommodating a disk as a recording medium including a housing on which a disk accommodating section for accommodating the disk and an opening portion for allowing the disk to be accommodated into the disk accommodating section therethrough are provided, and a lid member configured to close up the opening portion, the housing having a support portion for supporting a one-end side of the lid member for pivotal motion such that the other end side of the lid member may move toward and away from the housing, the disk accommodating section having an upright piece attached for pivotal motion on the side opposite to the side thereof on which the support portion is provided such that the upright piece engages at one end thereof with the disk accommodating section and at the other end thereof with the lid member so as to be erected uprightly from the disk accommodating section in response to pivotal motion of the lid member, the upright piece having a raising up portion provided thereon for raising up, when the lid member is pivoted in a direction in which the lid member is spaced away from the housing, the disk accommodated in the disk accommodating section from the disk accommodating section.

The above and other features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

In the following, an embodiment of the present invention is described based on the drawings.

[General Configuration of the Disk Apparatus 1]

Figure 1:
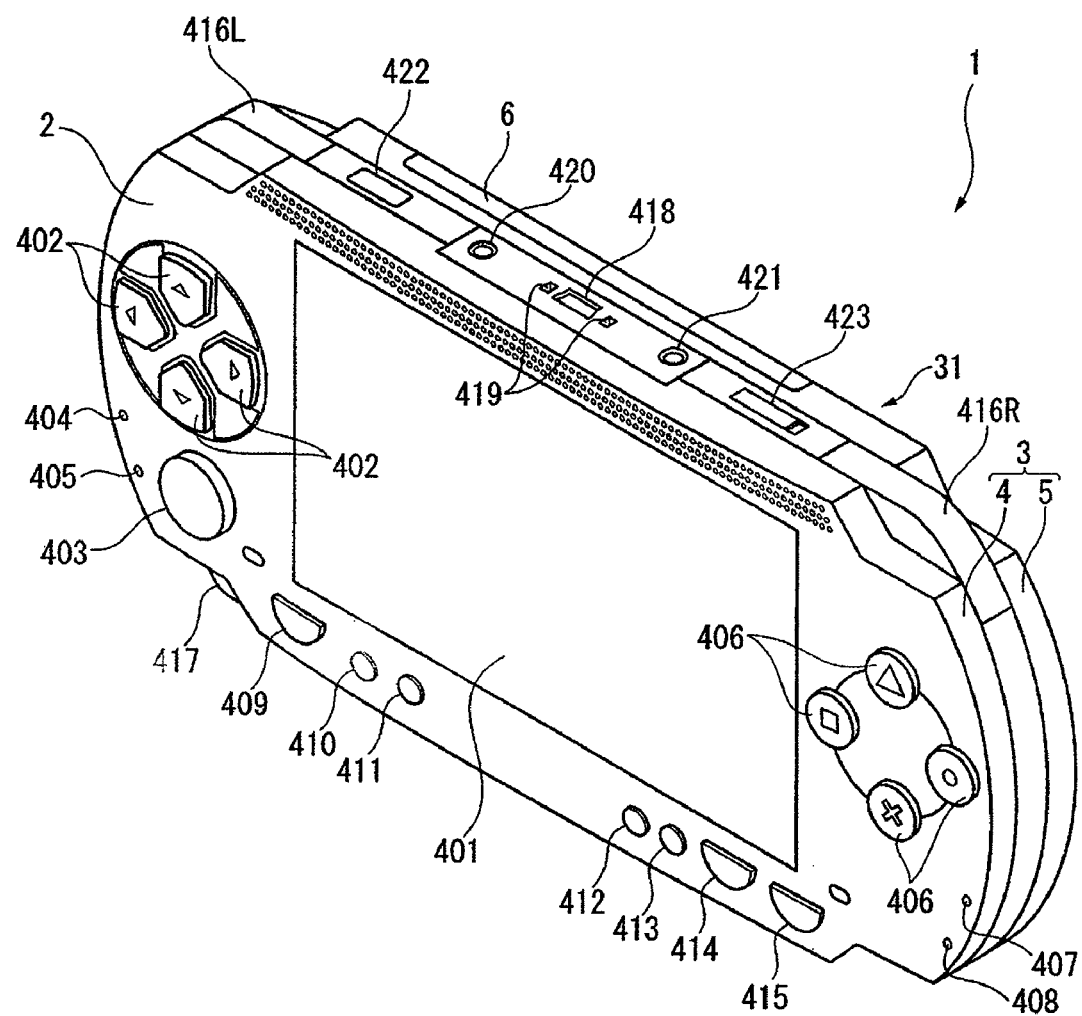
FIG. 1 is a perspective view of a disk apparatus according to an embodiment of the present invention as viewed from the front side.

FIG. 1 is a perspective view of a disk apparatus 1 according to an embodiment of the present invention as viewed from the front side.

The disk apparatus 1 of the present embodiment is an electronic apparatus configured as a portable game machine, and, for example, reads out a game program and so forth recorded on a disk 9 (refer to FIG. 3) and executes the game program in response to an operation of keys and switches by a user (game player) or reproduces sound information and image information recorded on the disk 9. It is to be noted that execution of a game signifies to principally control the progress of a game and outputting and so forth of image and sound information.

As seen in FIG. 1, the disk apparatus 1 includes a disk accommodating member 2 having a flattened horizontally elongated rectangular shape and formed arcuately at the opposite end portions thereof. The disk accommodating member 2 includes a housing 3 and a lid member 6 attached to the housing 3.

[Configuration of the Housing 3]

The housing 3 includes a front case 4 which faces a user when the user holds the disk apparatus 1, and a rear case 5 secured to the rear face side of the front case 4 by screws.

A liquid crystal panel 401 of a horizontally elongated rectangular shape is provided at a substantially central portion of the front face side (side opposing to the user) of the front case 4 from between the front case 4 and the rear case 5. Various keys and so forth are provided on the opposite left and right sides of the front case 4 across the liquid crystal panel 401 and on the lower side of the liquid crystal panel 401.

More particularly, four directional keys 402 which individually indicate upward, downward, leftward and rightward directions, an analog device 403 and two LEDs 404 and 405 are disposed on the left side (left side portion in FIG. 1) of the liquid crystal panel 401. Among them, the four directional keys 402 are provided for contact with pressure sensors provided in a corresponding relationship thereto in the inside of the housing 3. If any of the directional keys 402 is outputted, then the input of the directional key 402 is detected by the corresponding pressure sensor, and a digital signal corresponding to the directional key 402 is inputted to a control apparatus not shown. The analog device 403 is formed for being pressed to move along the front case 4 and outputs an analog signal representative of the direction of the movement of the analog device 403 to the control apparatus. Meanwhile, from between the two LEDs 404 and 405, the LED 404 which is disposed on the upper side is an LED representing that a memory card (not shown) accommodated in the inside of the housing 3 is in a data writing/reading out state. Meanwhile, the LED 405 provided on the lower side represents a communication state of the disk apparatus 1.

Four determination keys 406 having characters of "Δ", "○", "x" and "□" indicated thereon, an LED 407, a power supply key (not shown) and a window portion 408 which indicates a different color when the power supply key is in a hold position are disposed on the right side (right side portion in FIG. 1) of the liquid crystal panel 401.

Among them, the four determination keys 406 are provided for contact with pressure sensors not shown provided individually in a corresponding relationship thereto in the inside of the housing 3. Similarly to the directional keys 402 described hereinabove, an input of any of the keys is detected by the corresponding pressure sensor, and a digital signal corresponding to the key is outputted to the control apparatus. The LED 407 indicates an on/off state of the power supply, and when the power supply to the disk apparatus 1 is in an on state, the LED 407 emits light of a green color, but during charging of a battery (not shown), the LED 407 emits light of an orange color.

A home key 409 for interrupting a game or the like to restore an initial display state, sound volume keys 410 and 411 for increasing and decreasing the sound volume, respectively, a luminance changeover key 412, a mute key 413, a select key 414, a start key 415 and so forth are disposed on the lower side (lower side portion in FIG. 1) of the liquid crystal panel 401. Among them, the luminance changeover key 412 is a key for changing over the luminance of the liquid crystal panel 401, and the mute key 413 is a key for muting the sound. The select key 414 and the start key 415 are keys to be operated ruing execution of a game.

The housing 3 is cut away at the four corners thereof, and from among the cutaway portions, determination keys 416L and 416R (left side determination key is denoted by 416L and right side determination key is denoted by 416R) are provided on the upper side left and right corners, and a strap threading portion 417 is provided on the lower side left corner.

A connection terminal 418 into and from which a miniB terminal complying with the USB (Universal Serial Bus) standards can be inserted and pulled out is provided at a substantially central portion of an upper face 31 of the housing 3 wherein the front case 4 and the rear case 5 are placed one on the other. Power supply terminals 419 whose electrodes are exposed through an opening are provided in such a manner as to sandwich the connection terminal 418 therebetween.

On the left outer side of the power supply terminals 419, a threaded hole 420 into which a screw (not shown) for securing an eternal apparatus connected to the connection terminal 418 is to be screwed is provided. Meanwhile, on the right side of the power supply terminals 419, a pin insertion opening 421 into which a positioning pin (not shown) provided on the external apparatus is to be inserted is formed. It is to be noted that, while, in the present embodiment, the threaded hole 420 is provided on the left side on the upper face and the pin insertion opening 421 is formed on the right side, they may be positioned reversely in the leftward and rightward directions. Or, a further configuration wherein a threaded hole is formed at a position at which the pin insertion opening 421 is formed may be used.

A light receiving window 422 is provided between the key 416L and the threaded hole 420 on the upper face 31, and an infrared communication module (not shown) for carrying out infrared communication with another external apparatus through the light receiving window 422 is provided on the housing 3.

Further, a lock slider 423 which restricts opening of the lid member 6 provided on the rear face side of the rear case 5 is provided between the key 416R and the pin insertion opening 421. If this lock slider 423 is slidably moved in one direction along the upper face 31 of the housing 3, then the opening restriction of the lid member 6 is canceled to enable opening of the lid member 6. Consequently, the disk 9 can be accommodated into a disk accommodating section 53 (refer to FIGS. 2 and 5) formed on the rear case 5.

Figure 2:
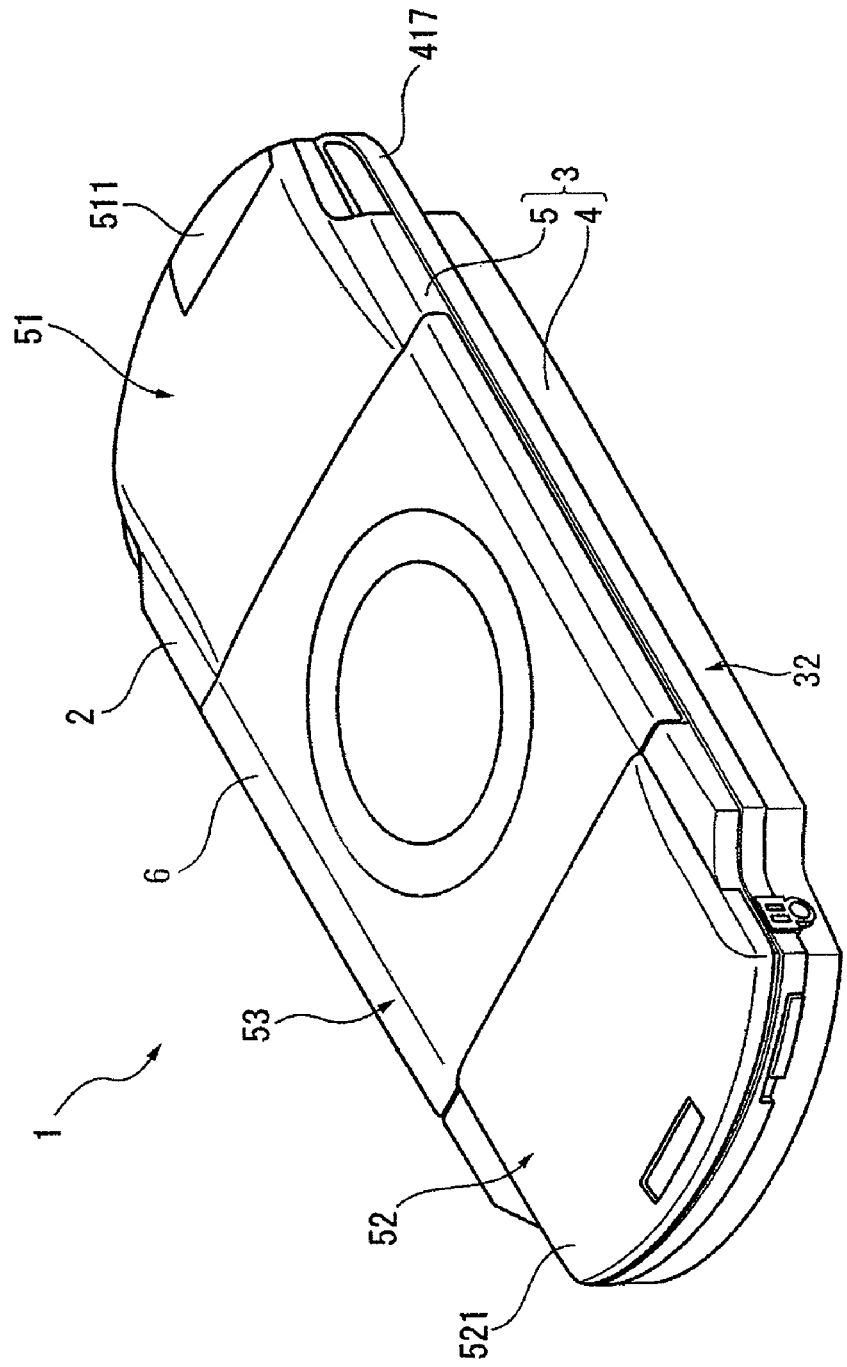
FIG. 2 is a perspective view of the disk apparatus according to the present embodiment as viewed from the rear side.

FIG. 2 is a perspective view of the disk apparatus 1 as viewed from the rear face side and shows the rear case 5.

The rear case 5 has an outer profile substantially same as that of the front case 4 and is secured to the rear face side of the front case 4 by screws as described hereinabove. This rear case 5 is divided into three regions along the leftward and rightward direction as seen in FIG. 2, and a memory card accommodating section 51 is formed on the right side (left side where the rear case 5 is held by the user). A battery pack accommodating section 52 is formed on the left side (right side where the rear case 5 is held by the user) while the disk accommodating section 53 is formed in the middle in such a manner as to be sandwiched by them.

The memory card accommodating section 51 includes a lid portion 511 mounted for opening and closing movement is configured such that a memory card (not shown) can be mounted into the inside of the memory card accommodating section 51 therethrough.

The battery pack accommodating section 52 includes a removable lid portion 521 configured such that a battery pack (not shown) can be accommodated into the inside of the battery pack accommodating section 52 therethrough.

The disk accommodating section 53 accommodates the disk 9 inserted therein through an opening portion 531 (refer to FIG. 5) for disk accommodation formed at the position thereof corresponding to the disk accommodating section 53.

The lid member 6 has dimensions substantially equal to those of the substantially rectangular opening portion 531 and is provided for pivotal motion in directions in which it moves toward and away from the rear case 5 around one end of the lid member 6. Then, if the lid member 6 is pivoted in the direction in which it moves away from the rear case 5, then the opening portion 531 is opened to expose the disk accommodating section 53. On the other hand, if the lid member 6 is pivoted in the direction in which it moves toward the rear case 5, then the opening portion 531 is closed up and the lid member 6 and the rear case 5 are placed into flush with each other. It is to be noted that a detailed configuration of the disk accommodating section 53 and the lid member 6 is hereinafter described.

[Configuration of the Disk 9]

Figure 3:
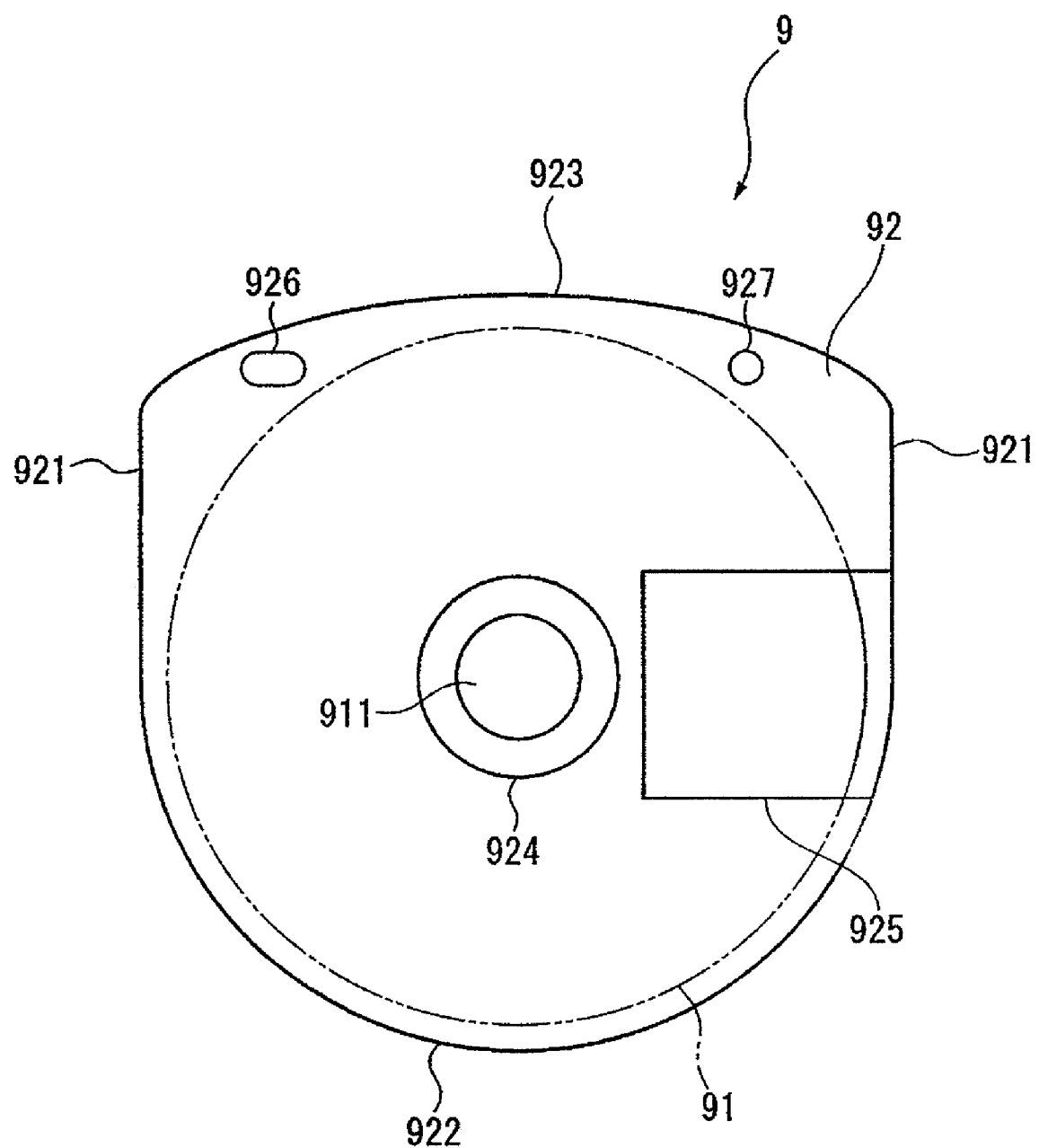
FIG. 3 is a plan view showing a disk according to the present embodiment.

FIG. 3 is a plan view showing the disk 9.

Here, the disk 9 used in the disk apparatus 1 is described.

The disk 9 as a recording medium includes, as shown FIG. 3, a disk body 91, and a cartridge 92 made of a synthetic resin material for accommodating the disk body 91 in the inside thereof. The disk body 91 is an optical disk of the optical reading type substantially having a shape of a disk, and a contacting portion 911 is provided at a substantially middle portion of the disk body 91. The contacting portion 911 is made of a metal material and having a substantially circular shape for being chucked by a turntable 532 (refer to FIGS. 5 and 7) which is provided in the disk accommodating section 53 and rotates the disk body 91. A game program, various image information of a movie or the like, sound information of music or and like and other information can be recorded on the disk body 91.

The cartridge 92 has a substantially escutcheon shape as viewed in plan. In particular, an outer peripheral face of the cartridge 92 is formed such that it has a pair of substantially parallel linear portions 921 (left and right portions in FIG. 3), a substantially semicircular semi-circular portion 922 (lower side portion in FIG. 3) which interconnects end portions (lower end portions of the linear portions 921 in FIG. 3) on the same side of the linear portions 921 and have a diameter equal to the distance between the end portions. Further, an arcuate portion 923 (upper side portion in FIG. 3) interconnects the other end portions of the pair of linear portions 921. The arcuate portion 923 is formed in an arc centered at a point on the outside of the semi-circular portion 922 on a straight line which extends from the center of the diameter of the semi-circular portion 922 and passes a substantially central portion of an end edge of the semi-circular portion 922.

Further, an opening 924 of a substantially circular shape for allowing the turntable 532 to contact with the contacting portion 911 of the disk body 91 is formed at the center of the cartridge 92, and the contacting portion 911 is exposed through the opening 924.

An opening 925 of a substantially rectangular shape for partially exposing the disk body 91 therethrough is formed in the bottom face (face shown in FIG. 3) of the cartridge 92. The opening 925 is formed at a position corresponding to a pickup 533 of the disk apparatus 1 for reading information from the disk body 91 when the disk 9 is accommodated in the disk accommodating section 53 and the lid member 6 is closed, and the recording face of the disk body 91 is exposed through the opening 925. Thus, the pickup 533 can optically read information recorded on the disk body 91 through the opening 925.

Further, pin insertion holes 926 and 927 are formed in a leftwardly and rightwardly symmetrical relationship on the inner side of the arcuate portion 923 of the bottom face of the cartridge 92. Positioning pins 535 are provided on the disk accommodating section 53 for positioning the disk 9 in the disk accommodating section 53 and are inserted into the pin insertion holes 926 and 927. The pin insertion hole 926 which is formed on the left side (side remote from the opening 925) in FIG. 3 is formed in an elliptic shape as viewed in plan while the pin insertion hole 927 formed on the right side (side adjacent the opening 925) is formed in a circular shape as viewed in plan.

[Configuration of the Disk Accommodating Section 53]

Figure 4:
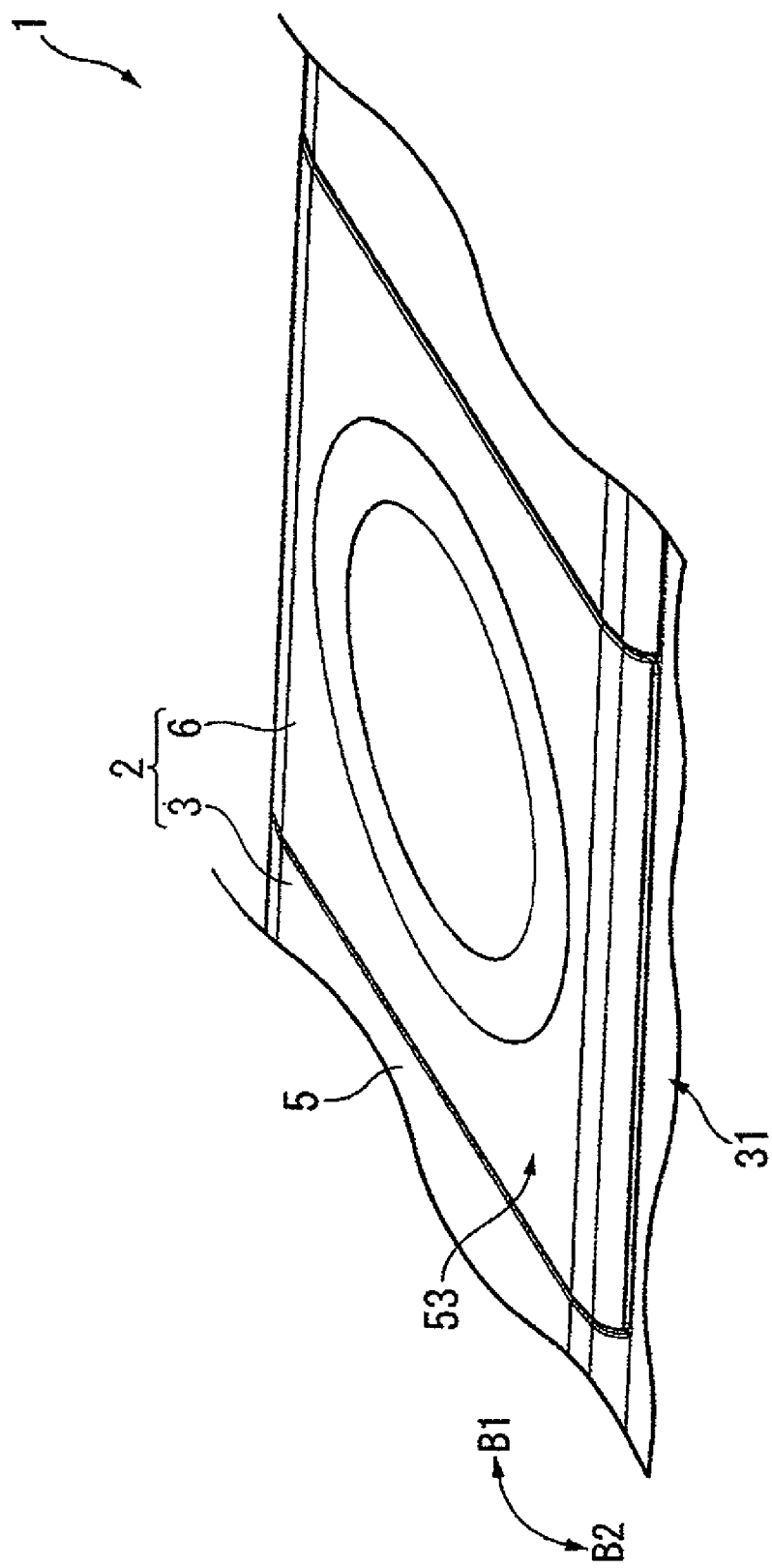
FIG. 4 is a perspective view showing a disk accommodating section according to the present embodiment.
Figure 5:
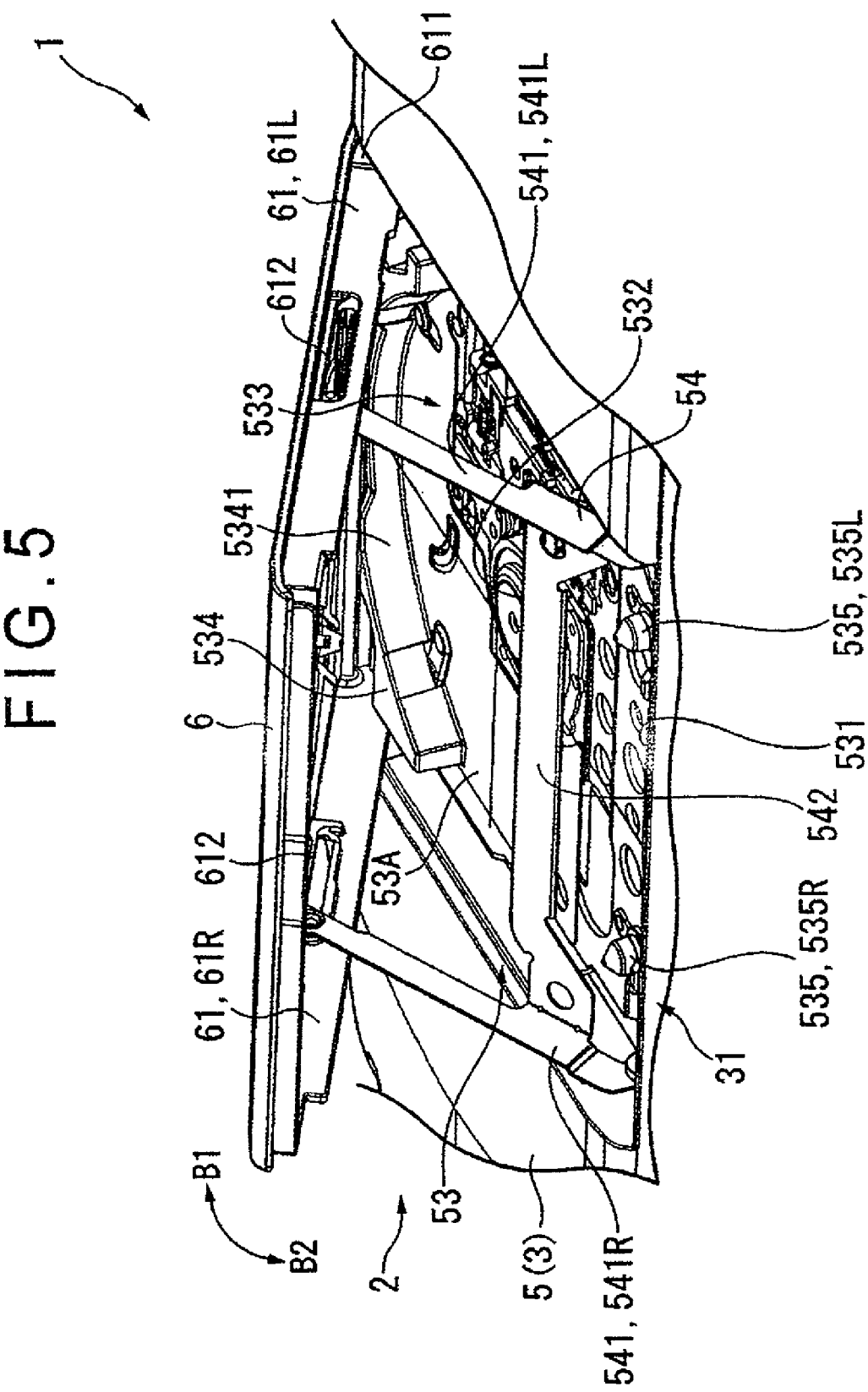
FIGS. 5 and 6 are perspective views showing the disk accommodating section according to the present embodiment.
Figure 6:
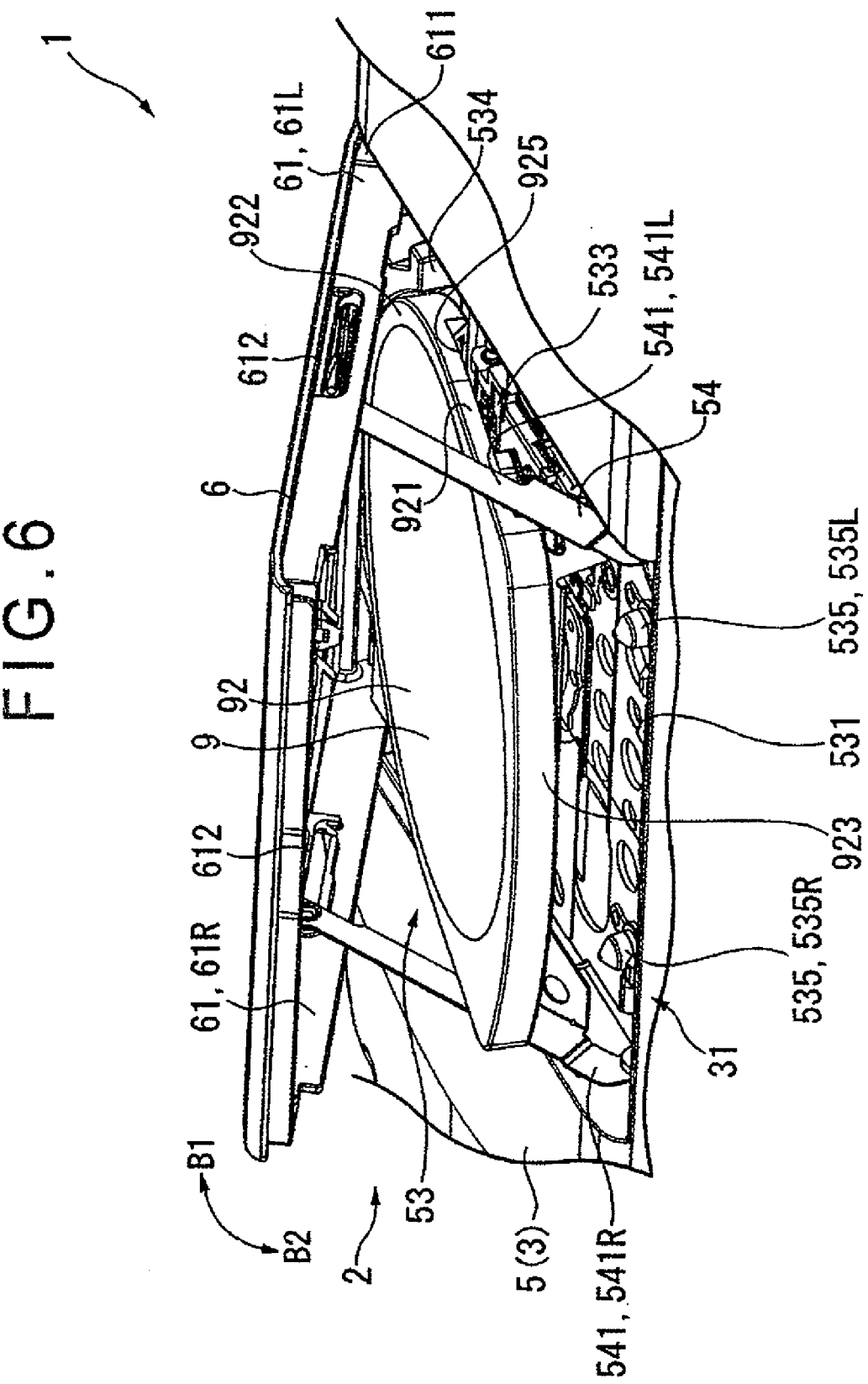

FIGS. 4 to 6 are perspective views showing the disk accommodating section 53. In particular, FIG. 4 is a view illustrating a state wherein the lid member 6 is closed; FIG. 5 is a view illustrating another state wherein the lid member is opened; and FIG. 6 is a view illustrating a further state wherein the disk 9 is inserted in the disk accommodating section 53.

The disk accommodating section 53 accommodates the disk 9 therein as described hereinabove. To this disk accommodating section 53, the lid member 6 of a substantially rectangular shape as viewed in plan is attached for pivotal motion in the directions of arrow marks B1 and B2 around an axis provided by one end of the housing 3 on the bottom face 32 (refer to FIG. 2) side.

This lid member 6 is released from locking by the housing 3 by slidably moving the lock slider 423 (refer to FIG. 1) provided on the upper face of the housing 3 as described hereinabove. If the lid member 6 is pivoted in the direction (direction indicated by the arrow mark B1) in which it is spaced away from the rear case 5 as seen in FIG. 5, then the disk accommodating section 53 is opened. Then, when the disk 9 is to be accommodated into the disk accommodating section 53, the disk 9 is inserted into the disk accommodating section 53 such that the bottom face (face shown in FIG. 3) of the cartridge 92 which forms the disk 9 is opposed to the bottom face 53A (face opposing to the lid member 6) of the disk accommodating section 53 and besides the semi-circular portion 922 of the cartridge 92 is positioned on the leading side in the insertion direction (direction of the arrow mark A). Then, the lid member 6 is pivoted in a direction (direction indicated by the arrow mark B2) in which the lid member 6 moves toward the housing 3). By this, the disk 9 is accommodated into the disk accommodating section 53.

Figure 7:
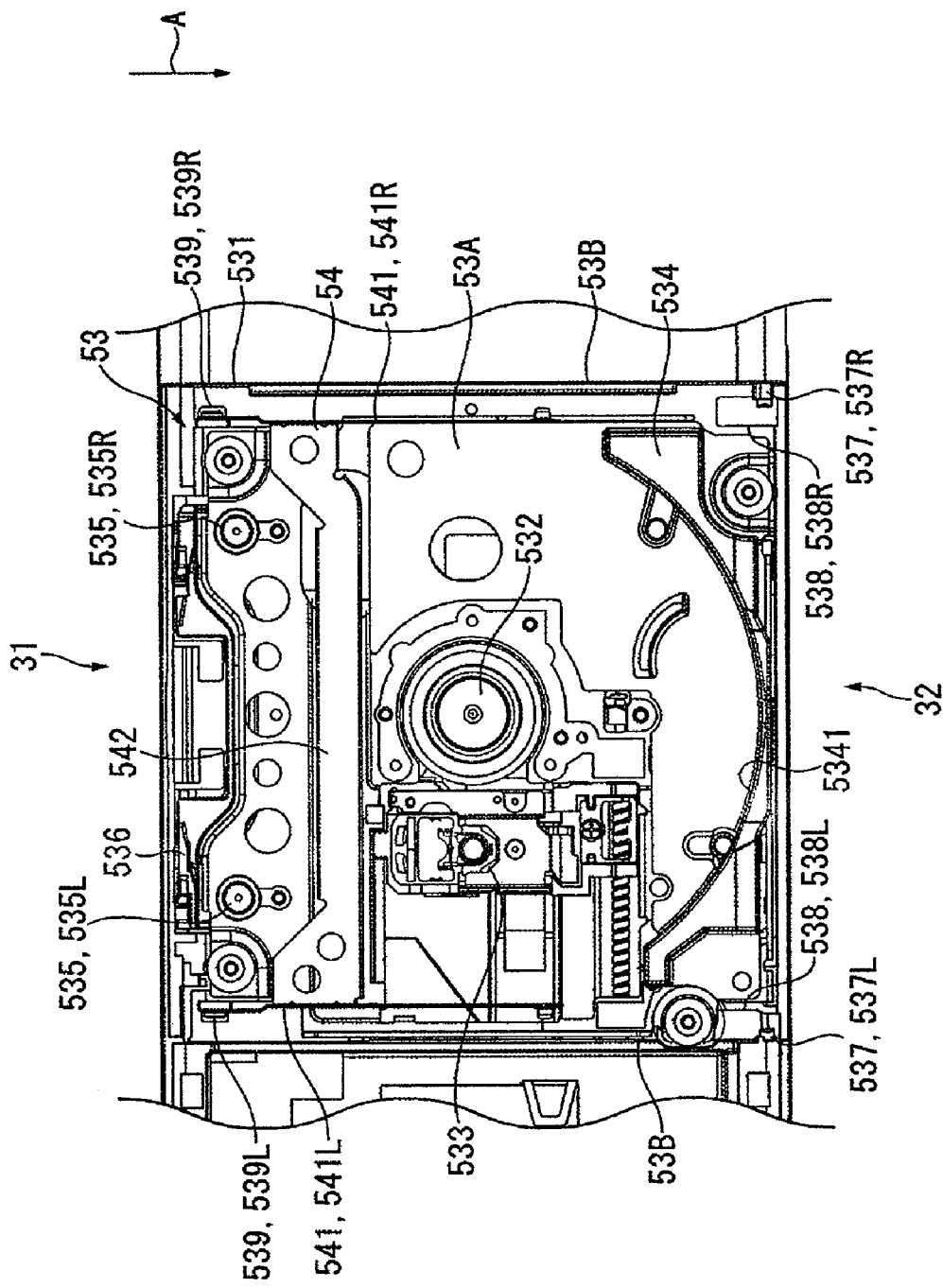
FIGS. 7 and 8 are plan views showing the disk accommodating section according to the present embodiment.
Figure 8:
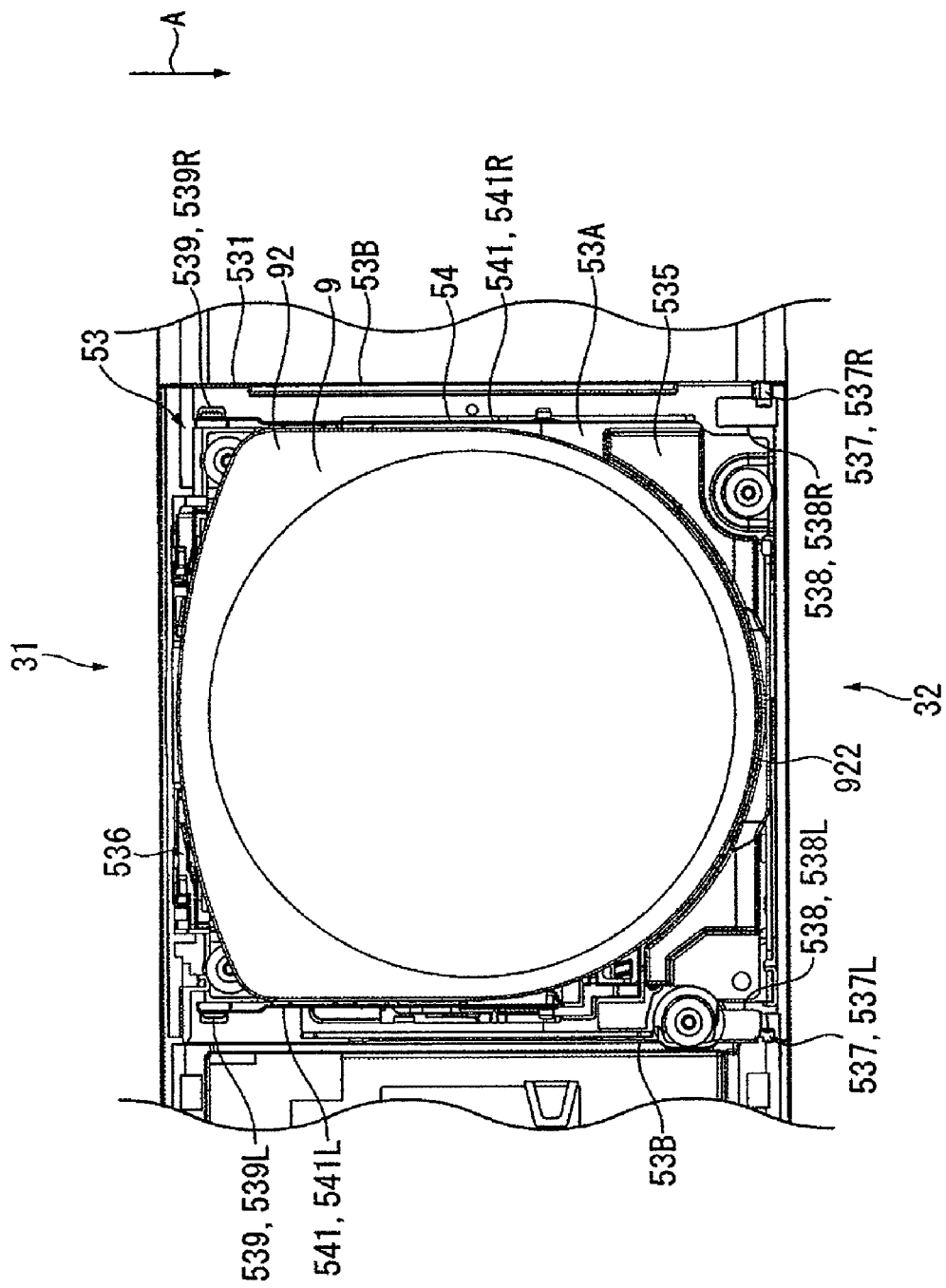

FIGS. 7 and 8 are plan views showing the disk accommodating section 53. In particular, FIG. 7 is a view illustrating a state wherein the disk 9 is not accommodated, and FIG. 8 is a view illustrating another state wherein the disk 9 is accommodated.

On such a disk accommodating section 53 as described above, a turntable 532, a pickup 533, a medium guide 534, positioning pins 535, lock levers 536 and an eject bar 54 are provided in addition to the above-described opening portion 531 for disk accommodation connected to the disk accommodating section 53 as seen in FIGS. 5 and 7. Further, support portions 537, communicating openings 538 and bar attaching portions 539 are formed. A configuration of the eject bar 54 is hereinafter described in detail.

The turntable 532 is disposed substantially at the center of the bottom face 53A of the disk accommodating section 53 of a substantially square shape as viewed in plan. Though not shown in detail, the turntable 532 includes a motor and a magnet attached to the rotary shaft of the motor, and the magnet contacts with the contacting portion 911 provided on the disk body 91 of the disk 9 described hereinabove to chuck the disk 9. Then, if the motor is driven, then the magnet which chucks the disk body 91 rotates thereby to rotate the disk body 91 at a high speed.

The pickup 533 corresponds to information reading/writing means of the present embodiment and is provided at a position of the bottom face 53A adjacent the turntable 532.

Then, the pickup 533 irradiates a laser beam upon the disk body 91, which is driven by the turntable 532 to rotate, through the opening 925 of the cartridge 92 to record information on the disk body 91 and receives reflected light from the recording face of the disk body 91 to optically read information recorded on the disk body 91.

The medium guide 534 determines the position on the leading end side in the insertion direction of the disk 9 accommodated in the disk accommodating section 53 and prevents the disk 9 from being accommodated in erroneous orientation into the disk accommodating section 53. This medium guide 534 is provided on the leading end side in the direction of the arrow mark A on the bottom face 53A, that is, at a position adjacent the pivot shaft of the lid member 6.

This medium guide 534 is formed in a concaved shape as viewed in plan which has an arcuate portion 5341 conforming to the semi-circular portion 922 of the cartridge 92 which forms the disk 9. Then, the arcuate portion 5341 is formed in an inclined relationship such that the projecting amount of the disk accommodating section 53 to the center side increases as the arcuate portion 5341 contacts with the bottom face 53A. In particular, the vertical section of the medium guide 534 has a substantially trapezoidal shape which has a greater dimension on the bottom face 53A side thereof and has a smaller dimension on the upper face side thereof spaced away from the bottom face 53A (the side opposing to the lid member 6).

Where the semi-circular portion 922 of the cartridge 92 contacts with such an arcuate portion 5341 as described above, if the lid member 6 is closed, then the disk 9 can be accommodated readily into the disk accommodating section 53 and besides the disk 9 can be accommodated to an appropriate position in the disk accommodating section 53. On the other hand, if the disk 9 is inserted in a wrong direction and the arcuate portion 923 of the disk 9 is brought into contact with the arcuate portion 5341, then since the shapes of them are not complementary to each other, the disk 9 is not accommodated into the disk accommodating section 53, and the lid member 6 cannot be closed. Consequently, the disk 9 can be prevented from being accommodated in wrong orientation into the disk accommodating section 53.

The positioning pins 535 (where the upper face 31 side of the housing 3 is directed upwardly, the left side positioning pin facing the bottom face 53A is referred to as 535L and the right side positioning pin is referred to as 535R) are provided one by one in a leftwardly and rightwardly symmetrical relationship on the side of the lid member 6 remote from the pivot shape side. In particular, the positioning pins 535 are provided one by one substantially symmetrically with respect to a straight line which extends along the direction of the arrow mark A and passes the center of the bottom face 53A when the disk accommodating section 53 is viewed in plan. When the disk 9 is accommodated into the disk accommodating section 53, the positioning pins 535 are individually inserted into the pin insertion holes 926 and 927 of the disk 9. Positioning of the disk 9 in the disk accommodating section 53 is carried out thereby. On the other hand, if the disk 9 is inserted upside down into the disk accommodating section 53, then the positioning pins 535 are not inserted into the pin insertion holes 926 and the lid member 6 cannot be closed. Consequently, wrong insertion of the disk 9 can be prevented.

The lock levers 536 (refer to FIG. 7) lock the lid member 6 in response to sliding movement of the lock slider 423 described hereinabove (refer to FIG. 1) to block pivotal motion of the lid member 6. Although detailed illustration is omitted, the lock levers 536 have hook-shaped portions of a substantially L shape as viewed in side elevation which slidably move along the bottom face 53A in an interlocking relationship with sliding movement of the lock slider 423. Then, the hook-shaped portions lock hook-shaped portions of a substantially L shape as viewed in side elevation which extend uprightly from a face of the lid member 6 which opposes to the bottom face 53A.

The support portions 537 (where the upper face 31 side of the housing 3 is positioned upwardly, the left side support portion facing the bottom face 53A is denoted by 537L and the right side support portion is denoted by 537R) are a pair of projections which are formed on the disk accommodating section 53 in the proximity of the bottom face 32 of the housing 3 for supporting the lid member 6 for pivotal motion. More particularly, the support portions 537 are formed as substantially cylindrical projections which extend uprightly from the bottom face 53A and extend uprightly outwardly from a pair of side faces 53B which oppose to the pair of linear portions 921 when the disk 9 is accommodated. The support portions 537 are formed as projections extending in opposing directions to each other individually from the pair of side faces 53B and are inserted in holes (not shown) formed in the lid member 6 to support the lid member 6 for pivotal motion in the direction indicated by the arrow mark B1 and the direction indicated by the arrow mark B2.

The communicating openings 538 (where the upper face 31 side of the housing 3 is directed upwardly, the left side communicating opening which faces the bottom face 53A is denoted by 538L and the right side communicating opening is denoted by 538R) are individually formed in the proximity of the support portions 537. Then, when the lid member 6 is attached to the support portions 537, arm portions 611 formed on the lid member 6 are fitted into the communicating openings 538. It is to be noted that a configuration of the lid member 6 is hereinafter described in detail.

The bar attaching portions 539 (where the upper face 31 side of the housing 3 is directed upwardly, the left side bar attaching portion facing the bottom face 53A is denoted by 539L and the right side bar attaching portion is denoted by 539R) are formed on the base end side of the bottom face 53A in the direction of the arrow mark A, that is, on the side adjacent the upper face 31. In particular, the bar attaching portions 539 are disposed substantially symmetrically with respect to a straight line which extends along the direction of the arrow mark A and passes the center of the bottom face 53A on the opposite side to the side on which the support portions 537 are formed with respect to the center of the bottom face 53A.

The bar attaching portions 539 extend uprightly from the bottom face 53A and are formed in a substantially L shape as viewed in side elevation such that end portions thereof are curved in directions in which they are spaced away from each other. Between them, the bar attaching portion 539L is inserted in a hole 5411 of the arm portion 541L formed on the eject bar 54 hereinafter described. Meanwhile, the bar attaching portion 539R is inserted in the hole 5411 of the arm portion 541R of the eject bar 54. The bar attaching portion 539L and the bar attaching portion 539R support the eject bar 54 for pivotal motion.

[Configure of the Lid Member 6]

Here, a configuration of the lid member 6 is described.

If the lid member 6 is pivoted in the direction indicated by the arrow mark B1 as described above, then it forms an opening which exposes the opening portion 531 and hence the disk accommodating section 53 therethrough to allow accommodation of the disk 9 into the disk accommodating section 53, but if the lid member 6 is pivoted in the direction indicated by the arrow mark B2, then it closes up the opening portion 531 and hence the disk accommodating section 53.

This lid member 6 is formed in a substantially square shape as viewed in plan as seen in FIGS. 4 to 6. Further, a leaf spring 62 (refer to FIGS. 13 to 15) for biasing the disk 9 toward the bottom face 53A when the lid member 6 is closed is provided on the bottom face of the lid member 6 which opposes to the disk accommodating section 53. Further, a pair of side walls 61 which extend uprightly outwardly are formed on the opposite end edges of the bottom face in the leftward and rightward directions (direction perpendicular to the direction of the arrow mark A).

The side walls 61 (where the upper face 31 side of the housing 3 is directed upwardly and the lid member 6 attached to the rear case 5 is viewed from the rear face side, the side wall positioned on the left side is denoted by 61L and the side wall positioned on the right side is denoted by 61R) have holes (not shown) formed therein. The support portion 537L is inserted in the hole of the side wall 61L while the support portion 537R is inserted in the hole of the side wall 61R such that the lid member 6 is supported for pivotal motion on the rear case 5.

In the proximity of the holes of the side walls 61, arm portions 611 extending farther than the ends of the side walls 61 in the upright direction are formed. When the lid member 6 is attached to the disk accommodating section 53, the arm portions 611 are fitted into the communicating openings 538 (refer to FIG. 7) formed in the bottom face 53A and are engaged with a torsion spring 56 provided on the front face side (face side opposing to the front case 4) of the rear case 5. It is to be noted that the configuration of the torsion spring 56 is hereinafter described in detail.

Further, a guide hole 612 of a substantially elliptic shape having a longitudinal direction in the direction of the arrow mark A is provided substantially at the center of each of the side walls 61. If projections 5412 of the eject bar 54 hereinafter described are inserted into the guide holes 612 and slidably move in the guide holes 612 in response to pivotal motion of the lid member 6, then the eject bar 54 is pivoted. Therefore, the pivotal motion of the lid member 6 and the eject bar 54 is defined by the dimension of the guide holes 612 in the longitudinal direction, more particularly the dimension from the positions of the projections 5412 in the guide holes 612 in a state wherein the lid member 6 is closed to the end edges of the guide holes 612 on the opposite side in the direction opposite to the direction of the arrow mark A. It is to be noted that, in the present embodiment, the dimension is set such that the intersecting angle (pivoting angle) between the bottom face 53A where the lid member 6 is pivoted most in the direction indicated by the arrow mark B1 and arm portions 541 hereinafter described of the eject bar 54 may be substantially 30°.

[Configuration of the Eject Bar 54]

Figure 9:
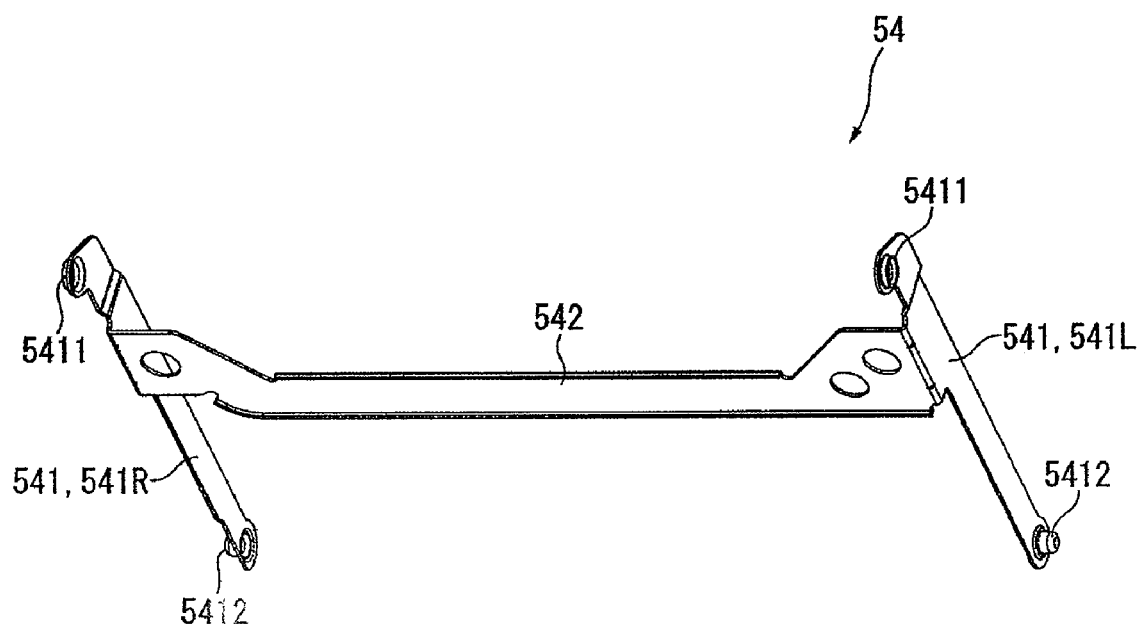
FIG. 9 is a perspective view showing an eject bar according to the present embodiment.

FIG. 9 is a perspective view showing the eject bar 54.

The eject bar 54 is attached for pivotal motion to the bar attaching portions 539 formed on the side of the bottom face 53A opposite to the support portions 537 as described hereinabove and extends uprightly from the bottom face in response to opening motion (pivotal motion in the direction indicated by the arrow mark B1) of the lid member 6 to lift the disk 9 accommodated in the disk accommodating section 53. This eject bar 54 has, as seen in FIG. 9, a pair of arm portions 541, and a raising up portion 542 interconnecting the pair of arm portions 541 for raising up the disk 9 from the bottom face 53A of the disk accommodating section 53. Consequently, the eject bar 54 is an integrally molded part formed in a substantially H shape as viewed in plan.

The pair of arm portions 541 (where the upper face side of the housing 3 is directed upwardly, the arm portion disposed on the left side facing the disk accommodating section 53 is denoted by 541L, and the arm portion disposed on the right side is denoted by 541R) correspond to raising up members of the present embodiment, and the pair of arm portions 541 are each formed as a plate. A hole 5411 is formed at an end portion of the same side of the pair of arm portions 541, and a projection 5412 is formed at the other end portion.

The support portion 537L is inserted in the hole 5411 of the arm portion 541L, and the support portion 537R is inserted in the hole 5411 of the arm portion 541R. Consequently, the pair of arm portions 541 are attached for pivotal motion to the disk accommodating section 53.

Meanwhile, the projection 5412 of the arm portion 541L is inserted in the guide hole 612 formed in the side wall 61L of the lid member 6, and the projection 5412 of the arm portion 541R is inserted in the guide hole 612 formed in the side wall 61R.

In this manner, the pair of arm portions 541 are disposed such that they are engaged with the disk accommodating section 53 and the lid member 6 so as to interconnect them such that the eject bar 54 rises up from the disk accommodating section 53 in response to pivotal motion of the lid member 6 in the direction (direction indicated by the arrow mark B1) in which the eject bar 54 is spaced away from the disk accommodating section 53 of the lid member 6, but the eject bar 54 comes to extend along the disk accommodating section 53 in response to pivotal motion of the lid member 6 in the direction (direction indicated by the arrow mark B2) in which the lie member 6 moves toward the disk accommodating section 53.

The raising up portion 542 is formed as a plate which interconnects the arm portions 541L and 541R at positions rather near to the holes 5411 from the center, and where the lid member 6 is closed, the raising up portion 542 is disposed so as to extend along the bottom face 53A as seen in FIG. 7. Further, this raising up portion 542 is disposed so as to extend from the raising up portion 542 positioned at the center of the bottom face 53A to the upper face 31 of the housing 3, more particularly, to the position at which the bar attaching portions 539 are formed. Therefore, where the lid member 6 is opened (pivoted in the direction indicated by the arrow mark B1), the eject bar 54 is tilted by the lid member 6 and the raising up portion 542 is spaced away from the bottom face 53A. It is to be noted that motion of the eject bar 54 upon opening or closing (pivotal motion in the direction indicated by the arrow mark B1 or in the direction indicated by the arrow mark B2) of the lid member 6 is hereinafter described.

[Configuration of the Torsion Spring 56]

Figure 10:
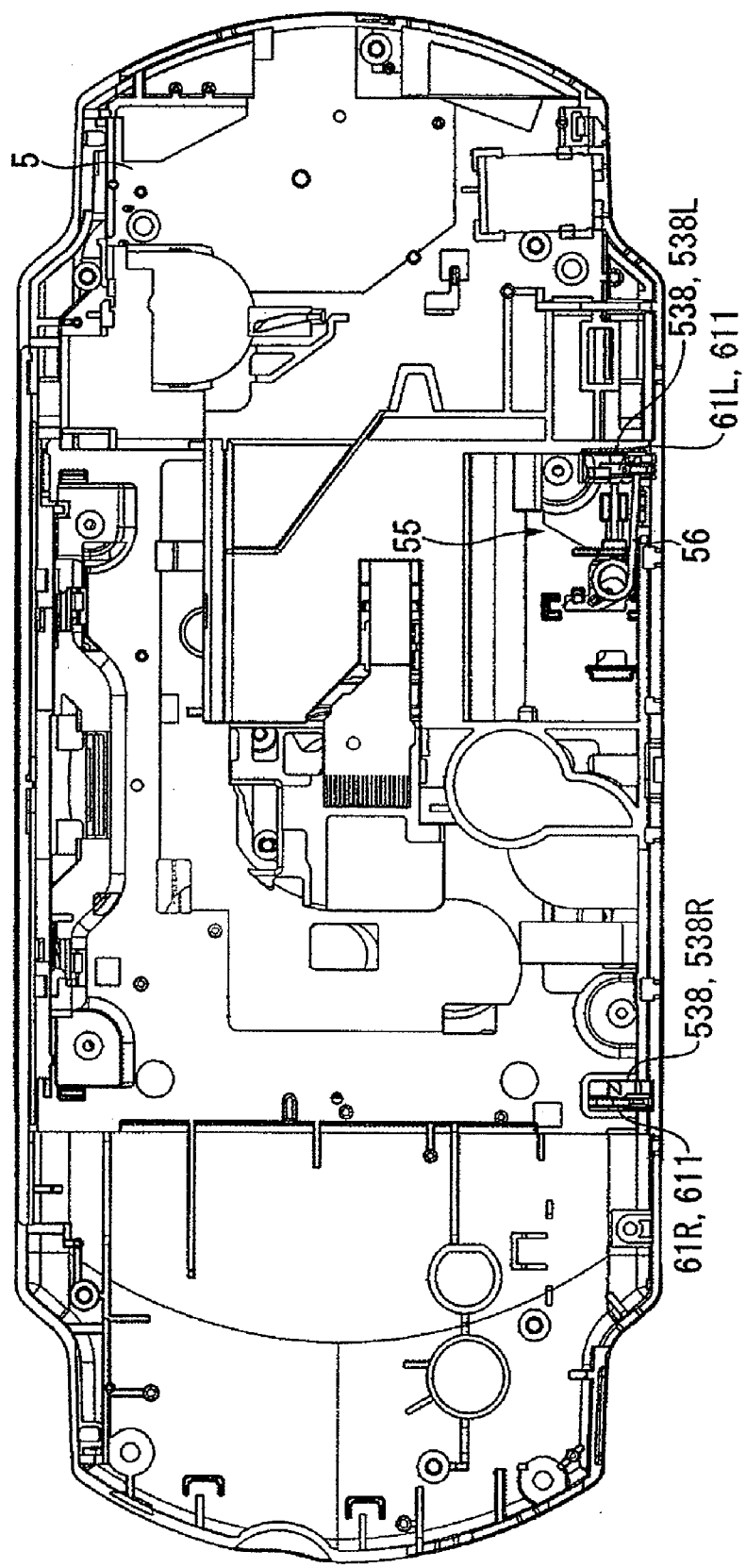
FIG. 10 is a plan view of a rear case according to the present embodiment as viewed from the front side.

FIG. 10 is a plan view of the rear case 5 as viewed from the front side.

As shown in FIG. 10, a spring accommodating portion 55 is formed in the proximity of the communicating opening 538L on the front face side of the rear case 5, and a torsion spring 56 serving as biasing means is provided in the spring accommodating portion 55. This torsion spring 56 engages with an arm portion 611 of the lid member 6 exposed to the front face side of the rear case 5 through the communicating opening 538 to exert biasing force to the lid member 6 in the direction indicated by the arrow mark B1 and the direction indicated by the arrow mark B2.

Figure 11:
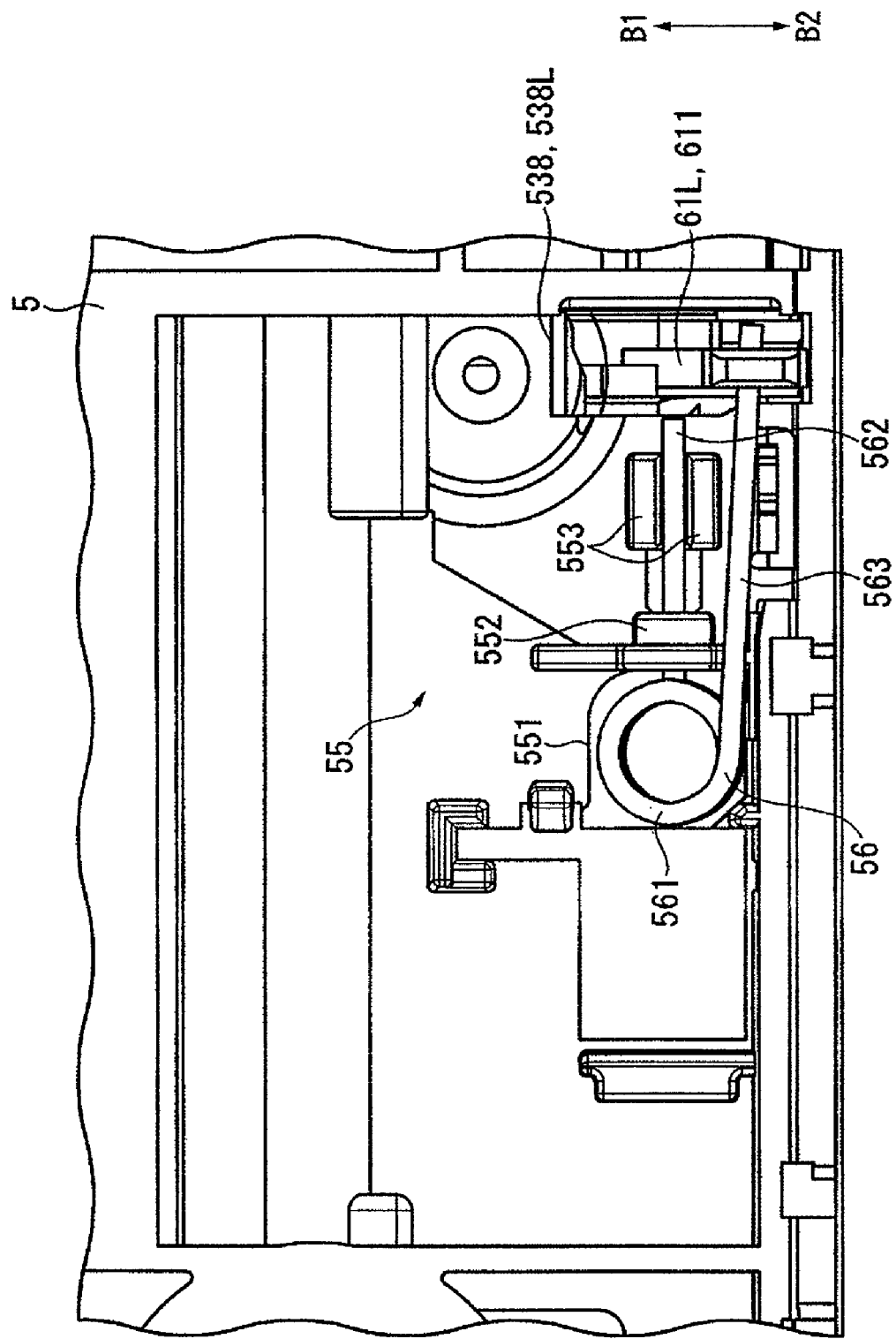
FIGS. 11 and 12 are partial enlarged views of the rear case according to the present embodiment illustrating operation of a torsion spring.
Figure 12:
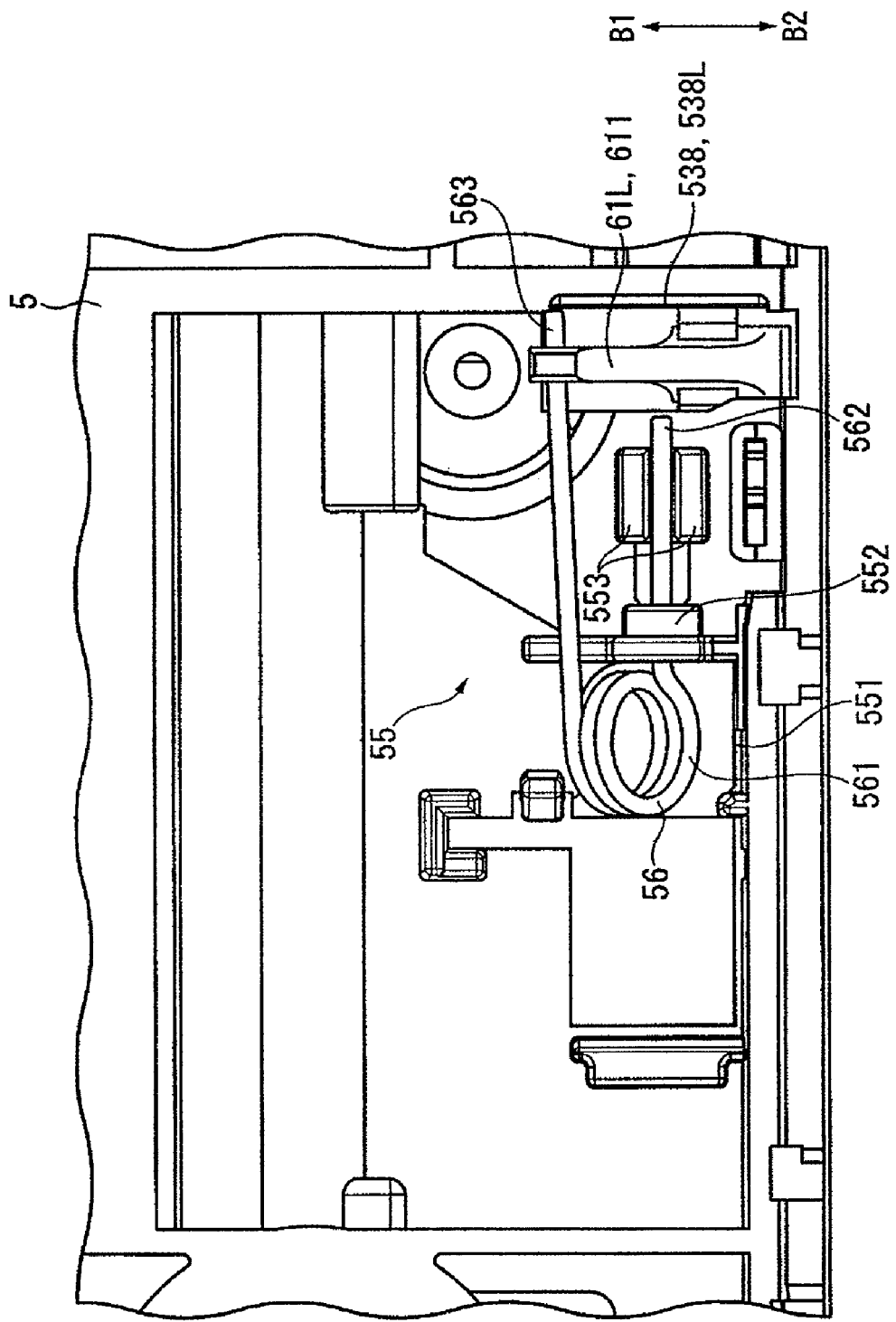

FIGS. 11 and 12 are partial enlarged views of the rear case illustrating motion of the torsion spring 56. In particular, FIG. 11 is a view illustrating a state of the torsion spring 56 in a state wherein the lid member 6 is closed up, and FIG. 12 is a view illustrating a state of the torsion spring 56 in another state wherein the lid member 6 is open.

As seen in FIGS. 11 and 12, the spring accommodating portion 55 includes a recessed portion 551, a holding portion 552, and a sandwiching portion 553.

Meanwhile, the torsion spring 56 has a coiled portion 561 formed from a wire material coiled spirally, and a pair of linear portions 562 and 563 extending from the opposite ends of the coiled portion 561.

The coiled portion 561 is disposed in the recessed portion 551. The linear portion 562 extends through a hole (not shown) formed in the holding portion 552 and is sandwiched by the sandwiching portion 553. Meanwhile, the linear portion 563 is inserted in a hole (not shown) formed in the arm portion 611 formed on the side wall 61L of the lid member 6.

Such a torsion spring 56 as described above is pivoted around the linear portion 562 sandwiched by the sandwiching portion 553 in response to a pivotal motion of the lid member 6 to exert biasing force in the direction of the motion of the lid member 6.

In particular, if the lid member 6 is pivoted in the direction indicated by the arrow mark B1 from its closing state (state wherein it closes up the opening portion 531) illustrated in FIG. 11 to its open state (state wherein the opening portion 531 is exposed) illustrated in FIG. 12, then together with the pivotal motion of the lid member 6, the torsion of the linear portion 562 sandwiched by the sandwiching portion 553 is eliminated while the linear portion 563 is twisted in the direction indicated by the arrow mark B1. Therefore, as the arm portion 611 of the lid member 6 advances from a position substantially over the middle of the range of movement of the arm portion 611, the biasing force in the direction indicated by the arrow mark B1 acts from the torsion spring 56 upon the arm portion 611. Consequently, the force required for pivotal motion of the lid member 6 toward the open state can be reduced, and besides the open state of the lid member 6 can be maintained.

On the other hand, if the lid member 6 is pivoted in the direction indicated by the arrow mark B2 from the open state illustrated in FIG. 12 to the closed state illustrated in FIG. 1, then together with the pivotal motion of the lid member 6, the linear portion 562 is twisted in the direction toward the arrow mark B2 while the torsion of the linear portion 563 is eliminated. Therefore, as the arm portion 611 advances in the direction indicated by the arrow mark B2 from a position substantially over the middle of the range of movement of the arm portion 611, the biasing force in the direction indicated by the arrow mark B2 acts from the torsion spring 56 upon the arm portion 611. Consequently, the force required for pivotal motion of the lid member 6 to the open state can be reduced, and besides the closed state of the lid member 6 can be maintained.

[Motion of the Eject Bar 54]

Figure 13:
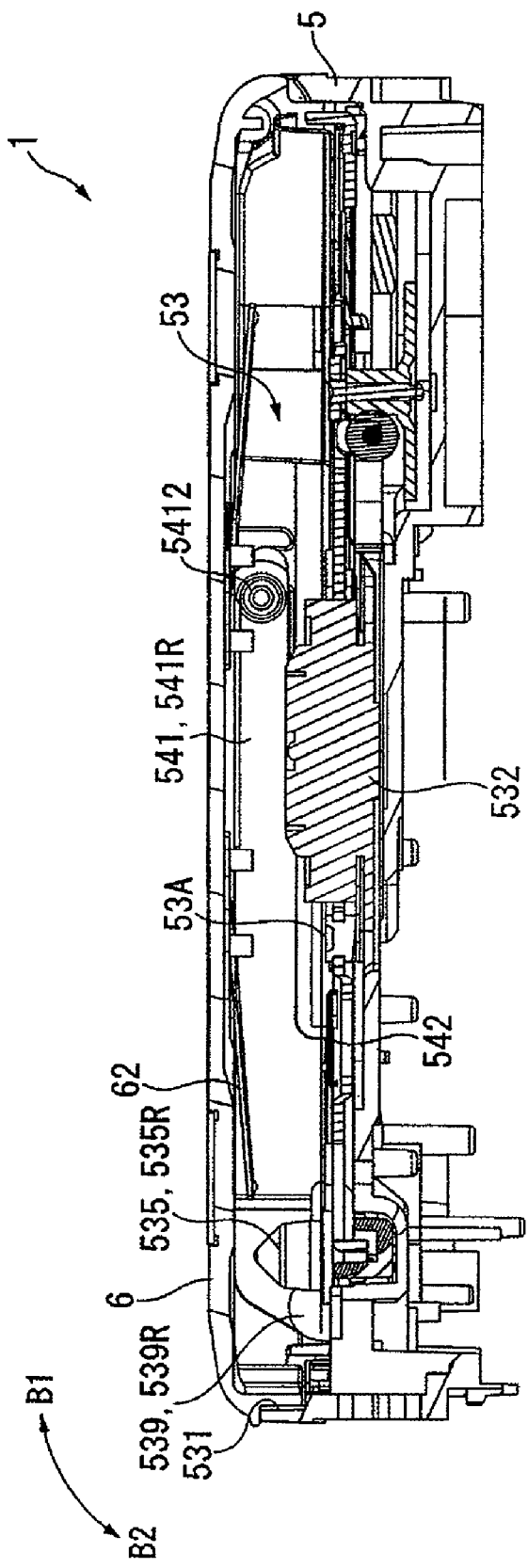
FIGS. 13 and 14 are sectional views showing the rear case according to the present embodiment in a state wherein the lid member is open.
Figure 14:
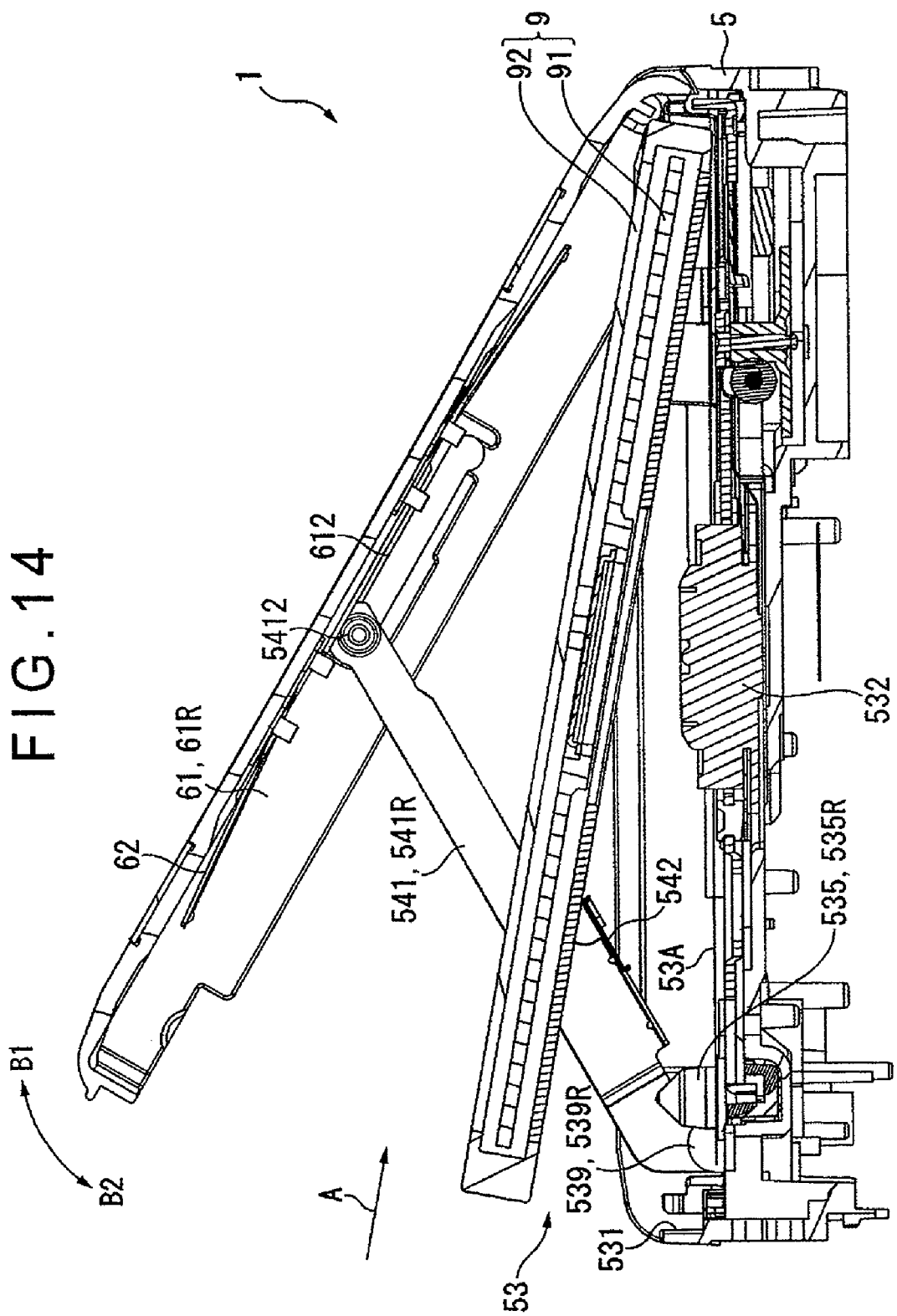
Figure 15:
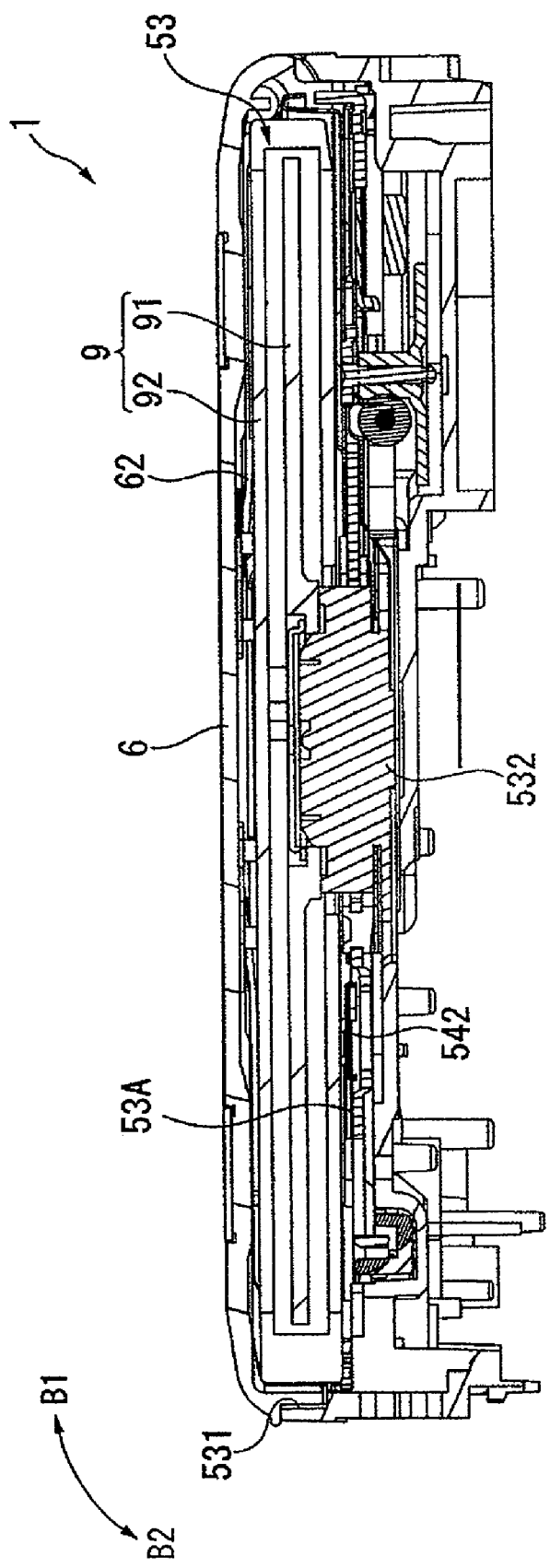
FIG. 15 is a sectional view showing the rear case according to the present embodiment in a state wherein the disk is accommodated.

FIG. 13 is a sectional view of the rear case 5 in the state wherein the lid member 6 is closed. Meanwhile, FIG. 14 is a sectional view showing the rear case 5 in a state wherein the lid member 6 is open and the disk 9 is inserted in the disk accommodating section 53. Further, FIG. 15 is a sectional view showing the rear case 5 in a state wherein the disk 9 is inserted in the disk accommodating section 53 and the lid member 6 is closed up. It is to be noted that, in FIGS. 13 to 15, the front case 4 is not shown.

In the following, motion of the eject bar 54 is described.

In the state wherein the lid member 6 is closed up, the raising up portion 542 of the eject bar 54 is disposed along the bottom face 53A of the disk accommodating section 53 as seen in FIG. 13. Further, in this state, the projections 5412 of the eject bar 54 are in contact with an end edge of the guide holes 612 on the side in the direction indicated by the arrow mark A.

If the lid member 6 in this state is pivoted in the direction indicated by the arrow mark B1, then while the projections 5412 of the eject bar 54 slidably move in the direction opposite to the direction indicated by the arrow mark A in the guide holes 612 formed in the arm portions 61L and 61R of the lid member 6 as seen in FIG. 14, the arm portions 541 of the eject bar 54 are pivoted around the holes 5411 until they stand uprightly from the bottom face 53A of the disk accommodating section 53. Then, when the lid member 6 is brought into contact with the end edge of the guide holes 612 on the side in the direction opposite to the direction indicated by the arrow mark A, the pivotal motion of the lid member 6 in the direction indicated by the arrow mark B1 is restricted. In this state, the lid member 6 is biased in the direction indicated by the arrow mark B1 by the biasing force of the torsion spring 56 described hereinabove, and the open state of the lid member 6 is maintained.

Thereupon, the raising up portion 542 of the eject bar 54 is spaced away from the bottom face 53A thereby to prevent, upon insertion of the disk 9 into the disk accommodating section 53, interference of the semi-circular portion 922 of the disk 9 with the turntable 532 and the pickup 533. Further, the arm portions 541L and 541R of the eject bar 54 attached to the opposite ends of the bottom face 53A in the leftward and rightward direction and extending uprightly from the bottom face 53A guide the disk 9 upon insertion into the disk accommodating section 53.

On the other hand, if the lid member 6 is pivoted in the direction indicated by the arrow mark B2 from the state illustrated in FIG. 14 until the disk accommodating section 53 is closed up with the lid member 6, then the disk 9 is accommodated into the disk accommodating section 53 as seen in FIG. 15. In this state, the lid member 6 is maintained in the closed state by the biasing force of the torsion spring 56 described hereinabove.

Thereupon, the eject bar 54 is disposed along the bottom face 53A similarly as in the state illustrated in FIG. 13, and consequently, the raising up portion 542 of the eject bar 54 is disposed along the bottom face 53A at a position (position from the turntable 532 to the side in the direction opposite to the direction indicated by the arrow mark A which is the disk insertion direction) from the turntable 532 positioned at the center of the bottom face 53A to the bar attaching portions 539. Consequently, it is possible to prevent chucking of the disk 9 by the turntable 532 from being disturbed by the raising up portion 542.

If the lid member 6 is pivoted from the state illustrated in FIG. 15 in the direction indicated by the arrow mark B1 to expose the disk accommodating section 53, then together with the pivotal motion of the lid member 6 in the direction indicated by the arrow mark B1, the eject bar 54 is erected uprightly from the bottom face 53A as seen in FIG. 14. Consequently, the raising up portion 542 which contacts with the bottom face of the disk 9 moves the disk 9 away from the bottom face 53A to cancel the chucking of the disk 9 and the turntable 532. Then, the disk 9 is supported by the raising up portion 542 and is raised up from the disk accommodating section 53 in response to further pivotal motion of the lid member 6. Thereupon, a large gap is formed between the lid member 6 and the raising up portion 542. Consequently, the disk 9 accommodated in the disk accommodating section 53 can be taken out readily. Further, thereupon, since the semi-circular portion 922 is in contact with the medium guide 534 and the disk 9 is positioned between the pair of arm portions 541L and 541R, dropping of the disk 9 from the disk accommodating section 53 can be prevented.

Effects of the Embodiment

As described above, with the disk apparatus 1, the following effects are exhibited.

(1) The eject bar 54 supported for pivotal motion on the disk accommodating section 53 and engageable with the lid member 6 is erected uprightly from the bottom face 53A of the disk accommodating section 53 together with pivotal motion of the lid member 6 in the direction indicated by the arrow mark B1.

Consequently, since the raising up portion 542 formed on the eject bar 54 raises up the disk 9 disposed along the bottom face 53A together with the upright erection of the eject bar 54, taking out of the disk 9 from the disk accommodating section 53 can be carried out readily. Thereupon, since the gap between the lid member 6 and the raising up portion 542 increases in response to the increasing amount of the pivotal motion of the lid member 6, if the dimension of the guide holes 612 of the lid member 6 is adjusted, then taking out of the disk 9 from the disk accommodating section 53 and accommodation of the disk 9 into the disk accommodating section 53 can be carried out more readily. Accordingly, when compared with an alternative case wherein a holder for accommodating the disk 9 is provided on the lid member 6, taking out and accommodation of the disk 9 can be carried out simply and easily, and besides the configuration of the disk accommodating section 53 can be simplified.

(2) If the lid member 6 is placed into the closed state and the eject bar 54 is disposed so as to extend along the disk accommodating section 53 then the raising up portion 542 formed on the eject bar 54 is positioned on the opposite side to the direction from the turntable 532 positioned at the center of the disk accommodating section 53 toward the support portions 537, that is, between the turntable 532 and the bar attaching portions 539.

Consequently, when the lid member 6 is placed into the open state, the raising up portion 542 can space the arcuate portion 923 side which is the base end in the insertion direction of the disk 9 by a greater distance from the bottom face 53A than the semi-circular portion 922 side which is the leading end side in the insertion direction. Accordingly, the base end side in the insertion direction of the disk 9 with respect to the disk accommodating section 53 can be grasped more readily, and consequently, taking out of the disk 9 from the disk accommodating section 53 can be carried out further readily.

Further, since the raising up portion 542 is positioned between the turntable 532 and the bar attaching portions 539 on the bottom face 53A in this manner, upon accommodation of the disk 9 into the disk accommodating section 53, the disk 9 can be prevented from damaging the turntable 532 and the pickup 533.

(3) The eject bar 54 includes a pair of arm portions 541, which are disposed in such a manner as to sandwich the disk 9 accommodated in the disk accommodating section 53. The raising up portion 542 is formed as a plate in a contiguous relationship to the arm portions 541.

Consequently, the raising up portion 542 can support the disk 9 with certainty, and the disk 9 supported on the raising up portion 542 can be prevented from being tilted around an axis in the insertion direction of the disk 9. Accordingly, the raising up portion 542 can support the disk 9 stably, and taking out of the disk 9 can be carried out further readily.

Further, when the disk 9 is accommodated into the disk accommodating section 53, the arm portions 541 guide the disk 9. Consequently, accommodation of the disk 9 into the disk accommodating section 53 can be carried out further readily.

(4) The projections 5412 for being inserted into the guide holes 612 formed in the side walls 61 of the lid member 6 are formed in the arm portions 541 of the eject bar 54, and slidably move in the guide holes 612 in response to pivotal motion of the lid member 6.

Consequently, upright erection of the eject bar 54 in response to pivotal motion of the lid member 6 in the opening direction (direction indicated by the arrow mark B1) and lying down of the eject bar 54 in response to pivotal motion of the lid member 6 in the closing direction (direction indicated by the arrow mark B2) can be carried out with certainty. Accordingly, when the lid member 6 is in the open state, accommodation and taking out of the disk 9 can be carried out readily and with certainty. On the other hand, where the lid member 6 is in the closed state, the eject bar 54 can be prevented from making an obstacle to accommodation of the disk 9.

Further, by adjusting the dimension of the guide holes 61 in the longitudinal direction, the amount of pivotal motion of the lid member 6 with respect to the bottom face 53A can be adjusted. Accordingly, the magnitude of the opening formed by the lid member 6 and the disk accommodating section 53 can be adjusted simply and readily.

(5) The medium guide 534 is provided on the leading end side in the insertion direction of the disk 9, that is, on the support portions 537 side, on the disk accommodating section 53. This medium guide 534 has the arcuate portion 5341 conforming to the shape of the semi-circular portion 922 on the leading end side in the insertion direction of an escutcheon shape, and upon accommodation of the disk 9, the semi-circular portion 922 contacts with the arcuate portion 5341.

Consequently, the disk 9 can be positioned at an appropriate position in the disk accommodating section 53, and besides rocking motion of the disk 9 in the disk accommodating section 53 can be suppressed. Further, where the orientation of the disk 9 in the disk accommodating section 53 is reverse, that, where the disk 9 is inserted from the arcuate portion 923 side thereof, since the disk 9 is not compatible in shape with the arcuate portion 5341, the disk 9 can be prevented from being accommodated. Accordingly, the turntable 532 can chuck the disk 9 with certainty, and reading and writing of information from and to the disk 9 can be carried out with certainty by the pickup 533. Besides, wrong accommodation by wrong insertion of the disk 9 can be prevented.

(6) Since the torsion spring 56 serving as biasing means biases the lid member 6 in the B2 direction (first direction) which is a direction in which the opening portion 531 of the housing 3 is closed and the B1 direction (second direction) which is a direction in which the opening portion 531 is opened, the lid member 6 can be maintained in a state (open state) wherein it is pivoted in the B2 direction to open the opening portion 531 and another state (closed state) wherein it is pivoted in the B1 direction to close up the opening. Accordingly, an accommodation operation of the disk 9 into the disk accommodating section 53 and a taking out operation of the disk 9 from the disk accommodating section 53 carried out through the opening portion 531 can be carried out readily.

Further, the torsion spring 56 includes the coiled portion 561 and the pair of linear portions 562 and 563 extending from the opposite ends of the coiled portion 561, and the linear portion 563 engages with the side wall 61L of the lid member 6 while the linear portion 562 is sandwiched by the sandwiching portion 553 so as to extend in the direction of the axis of pivotal motion of the lid member 6. Consequently, since the coiled portion 561 is disposed such that the direction of the axis thereof intersects with the lid member 6, the torsion spring 56 can be attached to the housing 3 by providing the spring accommodating portion 55, which is a space corresponding to the dimension of the coiled portion 561 in the axial direction, in the housing 3.

Accordingly, reduction in thickness of the housing 3 can be anticipated when compared with a conventional case wherein a torsion spring disposed so as to engage at the other end thereof with the lid member 6 is used. Further, biasing of the lid member 6 in directions which are difficult to implement using such a torsion coil spring as described above, that is, in the B1 direction and the B2 direction, can be implemented.

(7) When the lid member 6 is pivoted in the B1 direction, the linear portion 563 is pivoted in a direction in which it is twisted together with the coiled portion 561 while the linear portion 562 is pivoted in the direction in which the twist thereof is eliminated. On the other hand, when the lid member 6 is pivoted in the B2 direction, the linear portion 563 is pivoted in the direction in which the torsion thereof is eliminated together with the coiled portion 561 while the linear portion 562 is pivoted in the direction in which it is twisted. Thereupon, the state wherein the distortion of the linear portion of one of the linear portions 562 and 563 is eliminated tends to be maintained. Therefore, where the lid member 6 is pivoted in the B1 direction, the torsion spring 56 exerts biasing force in the B1 direction on the lid member 6, but where the lid member 6 is pivoted in the B2 direction, the torsion spring 56 exerts biasing force in the B2 direction on the lid member 6. Consequently, the lid member 6 can be biased in the direction in which the lid member 6 is pivoted by the torsion spring 56. Accordingly, opening and closing of the lid member 6 can be carried out readily, and the open state and the closed state of the lid member 6 can be maintained with certainty.

(8) The coiled portion 561 has a dimension in the axis direction thereof smaller than the dimension in a diametrical direction thereof, and the torsion spring 56 is disposed such that, when the opening portion 531 is closed up with the lid member 6, the direction of the axis of the coiled portion 561 is substantially perpendicular to the lid member 6. Consequently, in the state wherein the opening portion 531 is closed up with the lid member 6, the dimension of the torsion spring 56 in the thicknesswise dimension (dimension of the torsion spring 56 in a direction along the thicknesswise dimension of the housing 3) can be minimized, and consequently, the thicknesswise dimension of the housing 3 can be reduced. Accordingly, reduction in thickness of the disk apparatus 1 can be anticipated.

(9) When the torsion spring 56 is viewed in the axial direction of the coiled portion 561, the linear portion 562 extends in a diametrical direction of the coiled portion 561, and the linear portion 563 extends in a direction spaced away from the leading end side in the extension direction of the linear portion 562 from one of the end portions of the coiled portion 561 in a direction perpendicular to the extension direction of the linear portion 562 from the center of the coiled portion 561. Consequently, since the linear portion 562 sandwiched by the sandwiching portion 553 acts as an axis of pivotal motion of the torsion spring 56, the radius of pivotal motion of the coiled portion 561 can be set to a dimension corresponding to the radius of the coiled portion 561. Accordingly, the range of motion of the torsion spring 56 can be reduced, and hence, further reduction in thickness of the housing 3 can be anticipated.

(10) Since the spring accommodating portion 55 for accommodating the torsion spring 56 is provided on the opposite side to the side of the rear case 5 of the housing 3 on which the disk accommodating section 53 is provided, the torsion spring 56 can be prevented from being exposed and further can be prevented from engaging with the disk 9 accommodated in the disk accommodating section 53. Accordingly, rotation of the disk 9 can be prevented from being disturbed, and reading of information from the disk 9 and writing of information on the disk can be carried out smoothly.

Further, according to such a configuration as described above, there is no necessity to form a space for accommodating the torsion spring 56 at a position displaced from the disk accommodating section 53 and on the side of the rear case 5 on which the disk accommodating section 53 is formed. Accordingly, further miniaturization of the housing 3 and hence the disk apparatus 1 can be anticipated.

In addition, since the torsion spring 56 for engaging with the lid member 6 and the rear case 5 is provided on the opposite side to the disk accommodating section 53 of the rear case 5, even where the lid member 6 is pivoted in the B1 direction, as the linear portion 563 engaging with the side wall 61L of the lid member 6 is brought into contact with the rear case 5, further pivotal motion of the lid member 6 in the B1 direction can be blocked. Accordingly, the range of pivotal motion of the lid member 6 can be defined.

(11) Since the side wall 61L has the arm portion 611 which extends through the communicating opening 538L and engages in a substantially perpendicular direction with the linear portion 563 of the torsion spring 56, it can engage with certainty with the linear portion 563 which is positioned on the opposite side of the rear case 5 to the side on which the disk accommodating section 53 is formed. Further, since the linear portion 563 and the arm portion 611 engage with each other in a substantially perpendicular relationship, the biasing force of the torsion spring 56 can act easily upon the arm portion 611 and hence the lid member 6. Accordingly, the biasing force exerted by the torsion spring 56 can be made act upon the lid member 6 with certainty.

(12) Since the coiled portion 561 is formed by coiling a wire member without a gap, the dimension of the coiled portion 561 in the axis direction can be reduced. Accordingly, miniaturization of the torsion spring 56 can be anticipated and hence further reduction in thickness of the housing 3 can be anticipated.

(13) Since, in such a disk apparatus 1 as described above, reduction in thickness and size is achieved as described hereinabove, the portability of the disk apparatus 1 as an electronic apparatus can be improved.

Modifications to the Embodiment

The present invention is not limited to the embodiment described above. Modifications, alterations and so froth within a range within which the object of the present invention can be achieved are included in the present invention.

While, in the embodiment described above, the eject bar 54 includes the pair of arm portions 541 and the raising up portion 542 for raising up the disk 9 from the disk accommodating section 53 is formed in the form of a plate in such a manner as to connect to the pair of arm portions 541, the present invention is not limited to this. In particular, if it is possible to raise up the disk 9 from the disk accommodating section 53, then only one arm portion 541 may be used and the number of such arm portions 541 does not matter.

While, in the embodiment described above, the raising up portion 542 is formed in the form of a plate continuous to the pair of arm portions 541, the present invention is not limited to this. In particular, only it is necessary for a raising up portion to be formed on each of the arm portions 541, but the arm portions may not be connected to each other by the raising up portion. For example, the raising up portion 542 may be curved if it does not interfere with chucking of the disk 9 by the turntable 532. Further, the raising up portion 542 need not be made of a metal material but may be made of a synthetic resin material or a fabric material.

While, in the embodiment described hereinabove, the raising up portion 542 is formed on the arm portion 541 such that it is positioned within the range from the center of the bottom face 53A to the bar attaching portions 539 on the opposite side to the side on which the support portions 537 are formed, that is, positioned on the opening side formed by the lid member 6 and the disk accommodating section 53 where the lid member 6 is pivoted in the opening direction (direction indicated by the arrow mark B1), the present invention is not limited to this. In particular, the position of the raising up portion 542 does not matter if the disk 9 is raised up so as to be tilted from the bottom face 53A when the lid member 6 is placed into the open state.

While, in the embodiment described hereinabove, the guide holes 612 are formed on the side walls 61 which are erected uprightly from the bottom face of the lid member 6 (face opposing to the disk accommodating section 53). In other words, the guide holes 612 may be formed in the bottom face. In particular, the position of the guide holes 612 does not matter or guide grooves may be used in place of the guide holes only if the guide holes or the guide grooves are configured such that they engage with an end on the opposite side to the end portion on the side of the arm portions 541 of the eject bar 54 on which the bar attaching portions 539 are attached and the end portion on the opposite side can slidably move along the bottom face.

While, in the embodiment described above, the disk accommodating device of the present invention is used in the disk apparatus 1, the present invention is not limited to this but can be applied also to a case which accommodates the disk 9.

While, in the embodiment described above, the torsion spring 56 is formed such that the dimension of the coiled portion 561 in the axial direction is smaller than the dimension of the coiled portion 561 in a diametrical direction, the present invention is not limited to this. In particular, the dimension of the coiled portion 561 in the axial direction and the dimension of the coiled portion 561 in a diametrical direction may be set suitably. Further, while the coiled portion 561 is disposed such that, when the opening portion 531 is closed up with the lid member 6, the axial direction of the coiled portion 561 coincides with a direction substantially perpendicular to the lid member 6, the present invention is not limited to this, but the direction of the coiled portion 561 may be set suitably.

In the embodiment described above, the coiled portion 561 extending in a diametrical direction of the coiled portion 561 is sandwiched by the sandwiching portion 553. Further, the linear portion 563 which extends along a tangential direction of the coiled portion 561 such that the end portion thereof in the extension direction is spaced away from the end portion of the linear portion 562 in the extension direction engages with the side wall 61L of the lid member 6. However, the present invention is not limited to this. In particular, the linear portion sandwiched by the sandwiching portion 553 may be the linear portion 563 while the linear portion which engages with the side wall 61L is the linear portion 562.

Further, while, when the torsion spring 56 is viewed from an axial direction of the coiled portion 561, the linear portion 562 sandwiched by the sandwiching portion 553 extends along a diametrical direction of the coiled portion 561 substantially at the center between an end portion of the coiled portion 561 at which the linear portion 563 is formed and an end portion on the opposite side to the end portion, the present invention is not limited to this. For example, the linear portion 562 may extend from the end portion of the coiled portion 561 on the opposite side to the end at which the linear portion 563 is formed. Further, the extension direction of the linear portion 562 in this instance may be set suitably, and for example, when the torsion spring 56 is viewed from the axial direction of the linear portion 562, the linear portion 562 may extend perpendicularly to a straight line which interconnects the end portions of the torsion spring 56 at which the linear portions 562 and 563 are formed. In such an instance, the extension direction is the direction along which the linear portion 562 extends in the present embodiment.

In addition, while, in the embodiment described above, the extension direction of the linear portion 563 which engages with the side wall 61L is a tangential direction to the coiled portion 561 and besides an end portion of the linear portion 563 in the extension direction is a direction in which it is spaced away from the end portion of the linear portion 562 in the extension direction, the present invention is not limited to this, but the extension direction of the linear portion 563 may be a tangential direction to the coiled portion 561. For example, the linear portion 563 may extend along the extension direction of the linear portion 562.

In particular, the position and the extension direction of the linear portions 562 and 563 may be set suitably. Further, while the coiled portion 561 is formed by winding a wire material without a gap, it may otherwise have a gap.

While, in the embodiment described above, the spring accommodating portion 55 for accommodating the torsion spring 56 is formed on the opposite side to the side of the rear case 5 on which the disk accommodating portion 53 is formed and the side wall 61L of the lid member 6 is exposed to the spring accommodating portion 55 side through the communicating opening 538L and engages with the linear portion 563 of the torsion spring 56, the present invention is not limited to this. In particular, the torsion spring 56 may be provided on the disk accommodating portion 55 side of the rear case 5, or the linear portion 563 and the side wall 61L may engage with each other on the disk accommodating portion 55 side.

While, in the embodiment described above, the side wall 61L of the lid member 6 and the linear portion 563 of the torsion spring 56 engage substantially perpendicularly with each other, the present invention is not limited to this. In particular, the engaging state of the side wall 61L and the linear portion 563 may be set suitably from the range of pivotal motion and the installed position of the side wall 61L and the torsion spring 56.

While a preferred embodiment of the present invention has been described using specific terms, such description is for illustrative purpose only, and it is to be understood that changes and variations may be made without departing from the spirit or scope of the following claims.

What is claimed is:

1. A disk accommodating device for accommodating a disk as a recording medium, comprising:
   a housing on which a disk accommodating section for accommodating the disk and an opening portion for allowing the disk to be accommodated into said disk accommodating section therethrough are provided; and a lid member configured to close up said opening portion, said housing having a support portion for supporting a one-end side of said lid member for pivotal motion such that the other end side of said lid member may move toward and away from said housing, said disk accommodating section having an upright piece attached for pivotal motion on the side opposite to the side thereof on which said support portion is provided such that said upright piece engages at one end thereof with said disk accommodating section and at the other end thereof with said lid member so as to be erected uprightly from said disk accommodating section in response to pivotal motion of said lid member, said upright piece having a raising up portion provided thereon for raising up, when said lid member is pivoted in a direction in which said lid member is spaced away from said housing, the disk accommodated in said disk accommodating section from said disk accommodating section.

2. The disk accommodating device according to claim 1, wherein said raising up portion is formed on the attachment position side of said upright pieces with respect to the center of said disk accommodating section when said opening portion is closed up with said lid member.

3. The disk accommodating device according to claim 1, wherein said upright piece is provided on each of the opposite sides of said disk accommodating section with respect to the center of said disk accommodation section, the upright pieces being positioned in the proximity of the opposite end portions of said disk accommodating section in a direction substantially perpendicular to the insertion direction of the disk into said opening.

4. The disk accommodating device according to claim 1, wherein said raising up portion is provided in the form of a plate which interconnects said upright pieces.

5. The disk accommodating device according to claim 1, wherein said lid member has guide holes formed therein so as to extend along the insertion direction of the disk into said opening portion and engage with said upright pieces, and
each of said upright pieces has a projection formed at an end portion on the opposite side to the end portion at which the upright piece is supported by said disk accommodating section such that the projections are inserted in and guided along the guide holes.

6. The disk accommodating device according to claim 1, wherein said disk accommodating section has a positioning portion provided on said support portion side thereof and having a substantially arcuate portion conforming to the shape of the disk for positioning the disk accommodated in said disk accommodating section.

7. A disk apparatus, comprising:
information reading/writing means for executing at least one of reading of information recorded on a disk and writing of information on the disk; and
a disk accommodating device according to claim 1.

8. The disk accommodating device according to claim 1, wherein
said housing includes
biasing means for engaging with said lid member to bias said lid member in a first direction in which the other end side of said lid member is positioned closely to said housing to close said opening portion and a second direction in which the other end side of said lid member is spaced away from said housing to open said portion, and
a sandwiching portion for sandwiching said biasing means,
said lid member including a side wall extending uprightly from a face thereof opposing to said housing in a direction perpendicular to the face until said side wall engages with said biasing means,
said biasing means including
a coiled portion formed by coiling a wire material by a plural number of turns,
a first linear portion extending in a tangential direction to said coiled portion from one of the opposite ends of said coiled portion in an axial direction of said coiled portion when said biasing means is viewed from the axis direction of said coiled portion, and
a second linear portion extending in a direction different from the tangential direction from the other end portion of said coiled portion in the axis direction of said coiled portion,
one of said first and second linear portions engaging with said side wall while the other one of said first and second linear portions is sandwiched by said sandwiching portion such that said the other end of said first and second linear portions extends along the direction of an axis of pivotal motion of said lid member.

9. The disk accommodating device according to claim 8, wherein one of said first and second linear portions is pivoted, when said lid member is pivoted in one of the first and second directions, in a direction in which the one linear portion is twisted together with said coiled portion while the other linear portion is pivoted in a direction in which the twist thereof is eliminated.

10. The disk accommodating device according to claim 8, wherein
said coiled portion is formed such that the dimension thereof in the axial direction is smaller than that the dimension thereof in a diametrical direction, and
said biasing means is disposed such that, when said opening portion is closed up with said lid member, the axial direction of said coiled portion extends substantially perpendicularly to said lid member.

11. The disk apparatus according to claim 8, wherein, when said biasing means is viewed in the axial direction of said coiled portion, said second linear portion extends in a diametrical direction of said coiled portion while said first linear portion extends, from one end portion side of said coiled portion in a direction perpendicular to the extension direction of said second linear portion from the center of said coiled portion, in a direction in which said first linear portion is spaced away from the end side of said second linear portion in the extension direction of said second linear portion,
said first linear portion being the one linear portion,
said second linear portion being the other linear portion.

12. The disk accommodating device according to claim 8, wherein said housing has
an accommodating portion provided on the side opposite to the side on which said housing opposes to said lid member and having said biasing means disposed thereon, and
a communicating opening in which said side wall is fitted so as to be exposed to the opposite side,
said sandwiching portion being provided in said accommodating portion,
the one linear portion engaging with said side wall on the opposite side of said housing.

13. The disk accommodating device according to claim 12, wherein said side wall has an arm portion provided on the end side of said side wall in the upright direction for engaging substantially perpendicularly with the one linear portion.

14. The disk accommodating device according to claim 8, wherein said coiled portion is formed by coiling the wire material without a gap left therein.

15. A portable electronic apparatus, comprising a disk apparatus according to claim 7.

16. The disk accommodating device according to claim 1, wherein said raising up portion is formed on a side opposite to a side at which said support portion is provided with respect to the center of said disk accommodating section when said opening portion is closed up with said lid member.

17. The disk accommodating device according to claim 1, wherein said upright piece engages with said disk accommodating section at a side opposite to a side on which said support portion is provided.

18. A disk accommodating device for accommodating a disk as a recording medium, comprising:
   a housing on which a disk accommodating section for accommodating the disk and an opening portion for allowing the disk to be accommodated into said disk accommodating section therethrough are provided; and
   a lid member configured to close up said opening portion,
   said housing having a support portion for supporting a one-end side of said lid member for pivotal motion such that the other end side of said lid member may move toward and away from said housing,
   said disk accommodating section having an upright piece attached for pivotal motion on the side opposite to the side thereof on which said support portion is provided such that said upright piece engages at one end thereof with said disk accommodating section and at the other end thereof with said lid member so as to be erected uprightly from said disk accommodating section in response to pivotal motion of said lid member,
   said upright piece having a raising up portion provided thereon for raising up, when said lid member is pivoted in a direction in which said lid member is spaced away from said housing, the disk accommodated in said disk accommodating section from said disk accommodating section.

19. A disk accommodating device for accommodating a disk as a recording medium, comprising:
   a housing on which a disk accommodating section for accommodating the disk and an opening portion for allowing the disk to be accommodated into said disk accommodating section therethrough are provided; and
   a lid member configured to close up said opening portion,
   said housing having a support portion for supporting a one-end side of said lid member for pivotal motion such that the other end side of said lid member may move toward and away from said housing,
   said disk accommodating section having an upright piece attached for pivotal motion, said upright piece having a first engaging portion that engages with said disk accommodating section and a second engaging portion that engages with said lid member being spaced apart from the first engaging portion so that said upright piece is erected uprightly from said disk accommodating section in response to pivotal motion of said lid member,
   said upright piece having a raising up portion provided thereon for raising up, when said lid member is pivoted in a direction in which said lid member is spaced away from said housing, the disk accommodated in said disk accommodating section from said disk accommodating section.

20. The disk accommodating device according to claim 19, wherein the first engaging portion is located at a portion on a side of a first end of said upright piece and the second engaging portion is located near a second end of said upright portion relative to the first engaging portion.

* * * * *